United States Patent
Wada et al.

(10) Patent No.: US 8,805,205 B2
(45) Date of Patent: Aug. 12, 2014

(54) OPTICAL MULTIPORT SPECTRAL PHASE ENCODER

(75) Inventors: Naoya Wada, Koganei (JP); Gabriella Cincotti, Koganei (JP); Xu Wang, Koganei (JP); Kenichi Kitayama, Suita (JP)

(73) Assignee: National Institute Of Information And Communications Technology, Tokyo (JP)

(*) Notice: Subject to any disclaimer, the term of this patent is extended or adjusted under 35 U.S.C. 154(b) by 681 days.

(21) Appl. No.: 12/668,025

(22) PCT Filed: Jul. 7, 2008

(86) PCT No.: PCT/JP2008/001808
§ 371 (c)(1),
(2), (4) Date: Mar. 3, 2010

(87) PCT Pub. No.: WO2009/008154
PCT Pub. Date: Jan. 15, 2009

(65) Prior Publication Data
US 2010/0196005 A1    Aug. 5, 2010

(30) Foreign Application Priority Data

Jul. 7, 2007  (JP) ................. 2007-179136

(51) Int. Cl.
 H04J 14/00  (2006.01)
 H04J 4/00   (2006.01)
 H04B 10/04  (2006.01)
 H04B 10/12  (2006.01)

(52) U.S. Cl.
 USPC ............ 398/188; 398/77; 398/182; 398/183; 398/189; 398/190; 398/191; 398/200; 398/201

(58) Field of Classification Search
 None
 See application file for complete search history.

(56) References Cited

U.S. PATENT DOCUMENTS 5,546,483 A * 8/1996 Inoue et al. ................ 385/14

FOREIGN PATENT DOCUMENTS

IT    WO 2005/064834 A1    7/2005
JP    2007-5888 A          1/2007

OTHER PUBLICATIONS

M. Hanawa, T. Yanagi, M. Takahara "DWDM transmission by time sp read signal" Technical Report of IEICE. CS99-27, OCS99-15 (May 1999), The Institute of Electronics, Information and Communication Engineers, p. 37-42, fig. 1-3.
G. Manzacca et al. "Comparative study of multi-encoding schemes for OCDMA using a single multi-port optical encoder/decoder", IEEE photonics Technology Letters, vol. 09, No. 8, pp. 559-561, Apr. 2007.

(Continued)

Primary Examiner — Kenneth N. Vanderpuye
Assistant Examiner — Darren E Wolf
(74) Attorney, Agent, or Firm — Pyprus Pte Ltd

(57) ABSTRACT

Data security of a multi-dimensional code system is increased. An optical device is provided with a single input port; a splitter splitting an input light from the input port into a plurality of lights; a plurality of phase shifters each shifting one of the lights split by the splitter; a multi-port encoder/decoder inputting the lights whose phases are shifted by the phase shifters and generating spectral encoded codes; and a plurality of output ports outputting the spectral encoded codes generated by the multi-port encoder/decoder.

7 Claims, 28 Drawing Sheets

(56) References Cited

OTHER PUBLICATIONS

G. Cincotti et al. "Security performance of optical multicoding transmission using a single multiport encoder/decoder", The 12th OptoElectronics and Communications Conference and 16th International Conference on Integrated Optics and Optical Fiber Communication (OECC/IOOC 2007), 11A3-5, pp. 126-127, Jul. 2007.

G. Cincotti, N. Wada, and K.-i. Kitayama "Characterization of a full encoder/decoder in the AWG configuration for code-based photonic routers. Part I: modelling and design", IEEE J. Lightwave Technol., vol. 24, n. 1, in press 2006.

N. Wada, G. Cincotti, S. Yoshima, N. Kataoka, and K.-i. Kitayama "Characterization of a full encoder/decoder in the AWG configuration for code-based photonic routers. Part II: experimental results" IEEE J. Lightwave Technol., vol. 24, n. 1, in press 2006.

\* cited by examiner

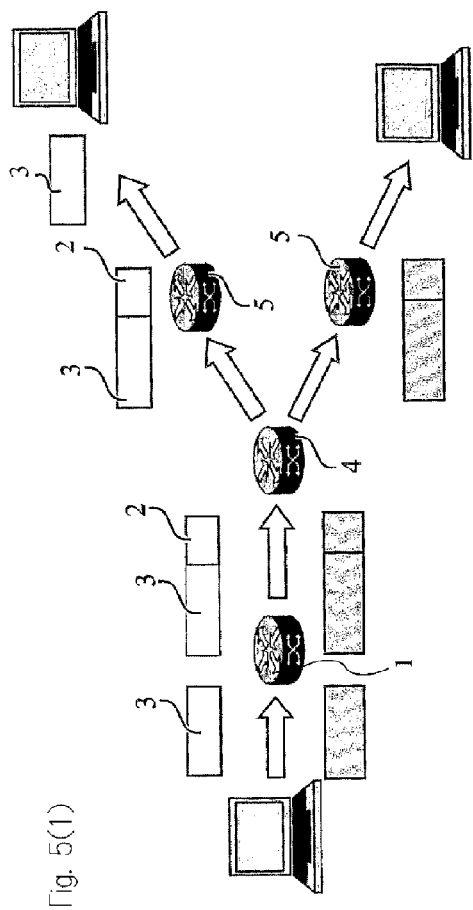
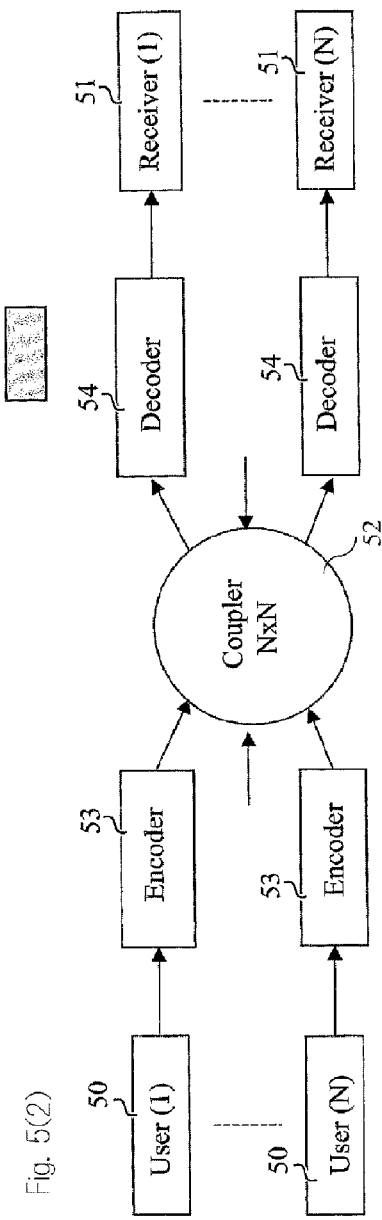
Fig. 5(1)
Fig. 5(2)
Fig. 5

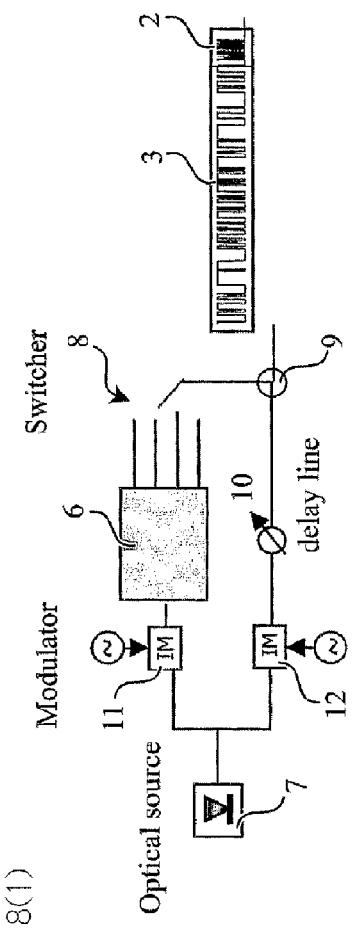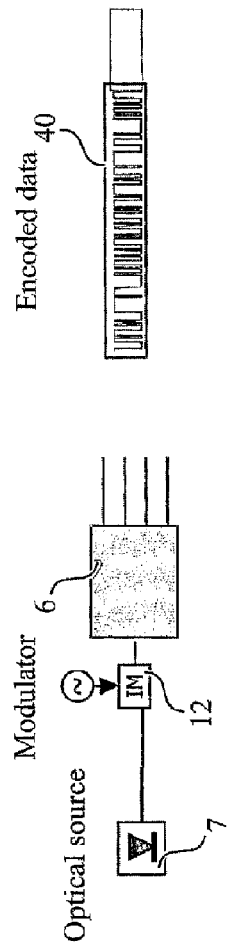
Fig. 8

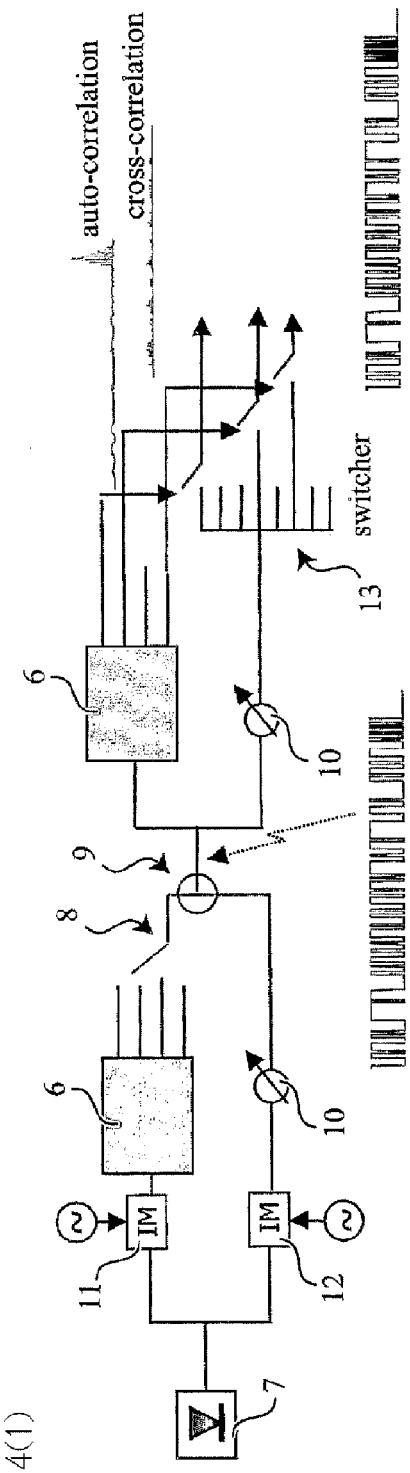
Fig. 14(1)
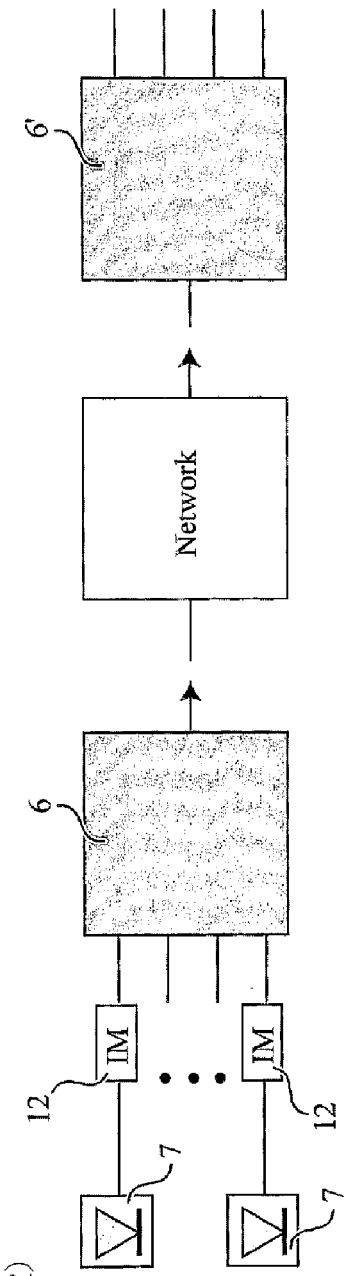
Fig. 14(2)
Fig. 14

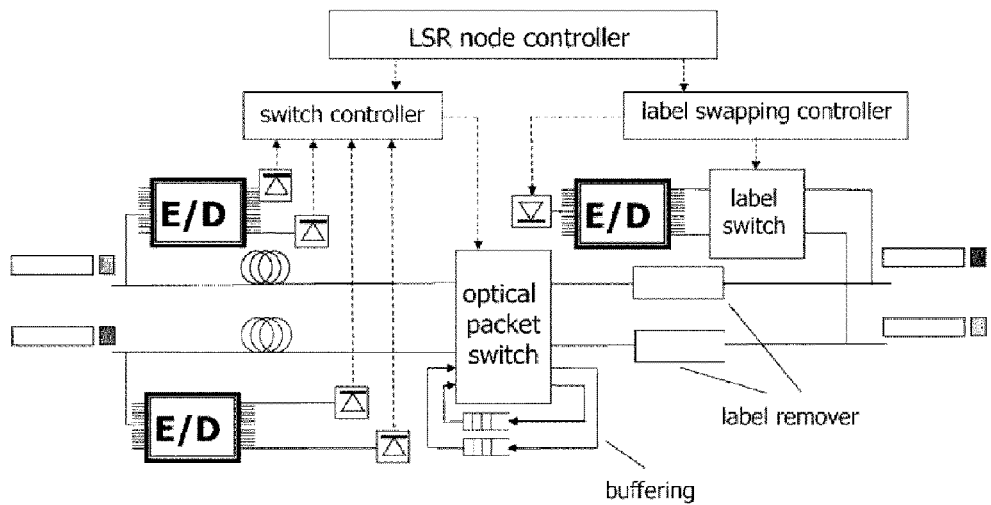
Fig. 19
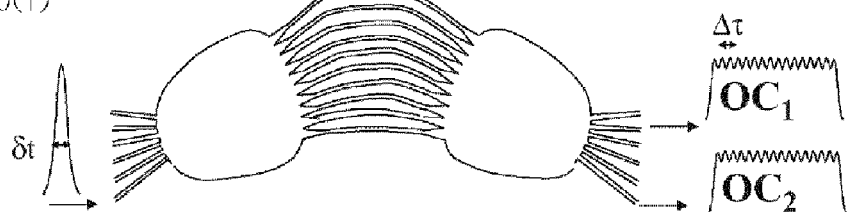
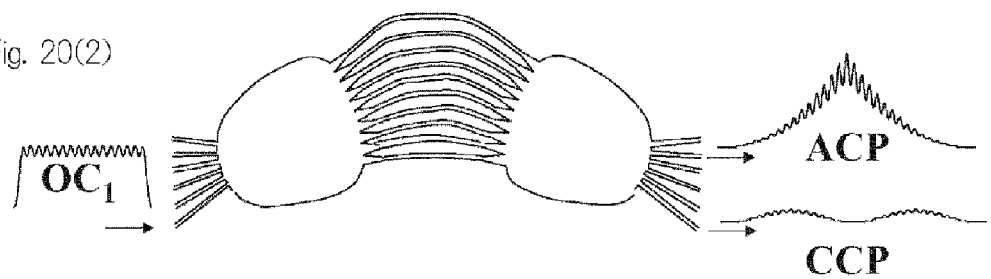
Fig. 20

Fig. 22(1)
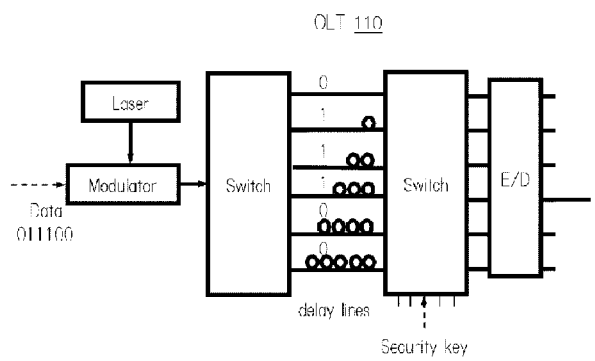
Fig. 22(2)
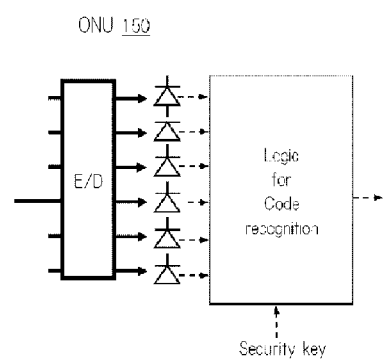
Fig. 22
Fig. 23(1)
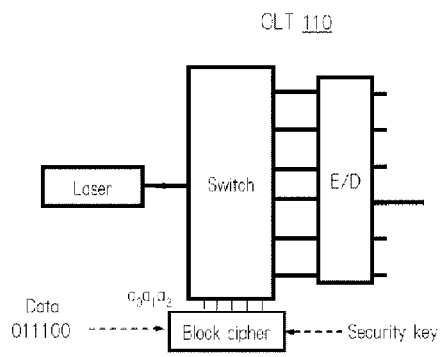
Fig.23(2)
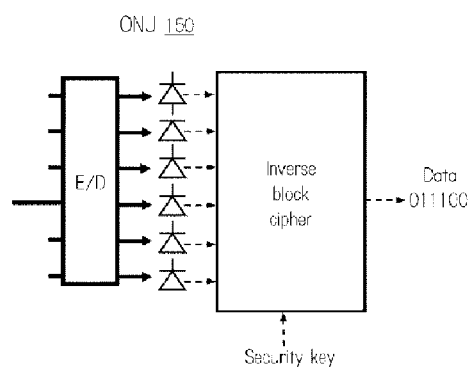
Fig. 23

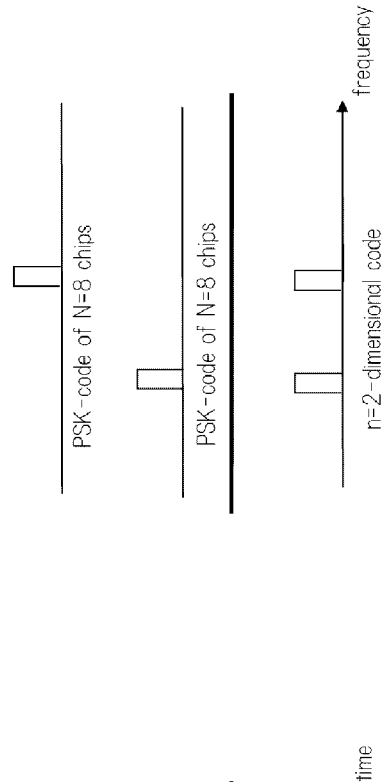
Fig. 25(1)
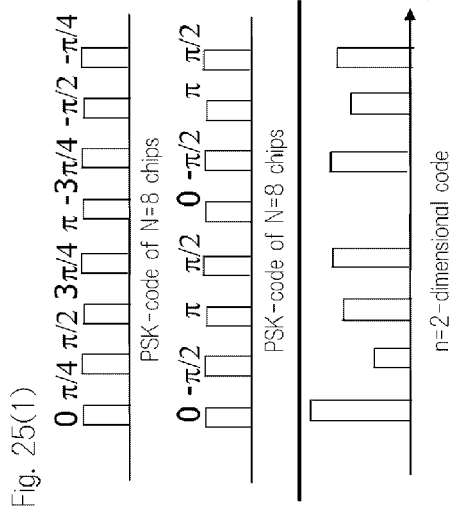
Fig. 25(2)
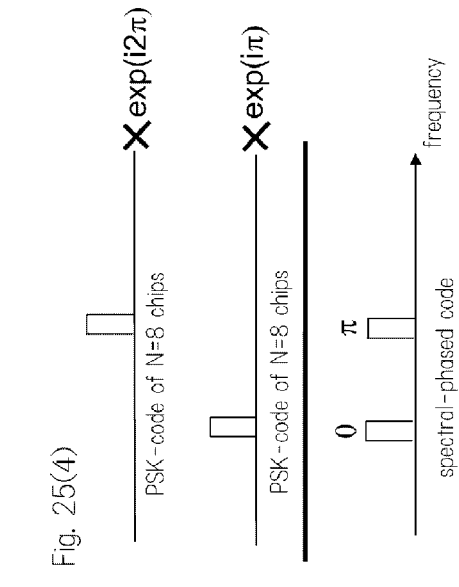
Fig. 25(3)
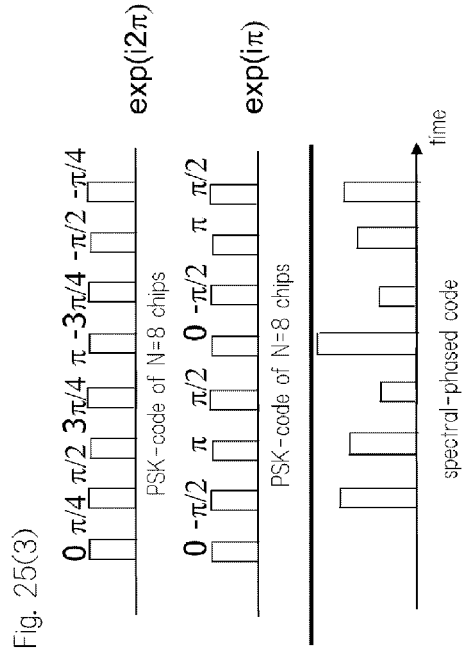
Fig. 25(4)
Fig. 25

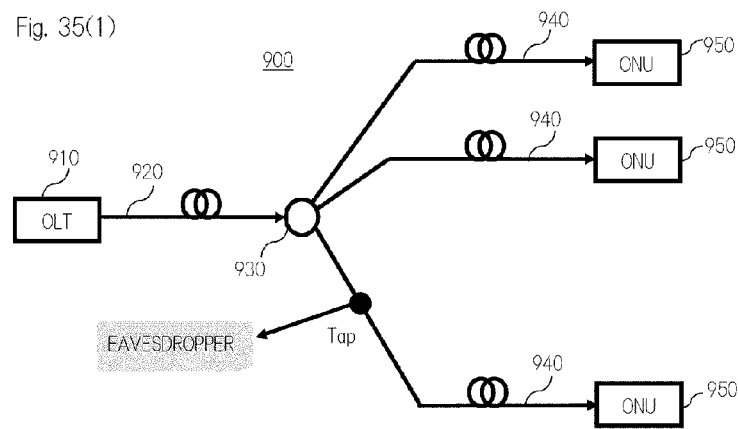
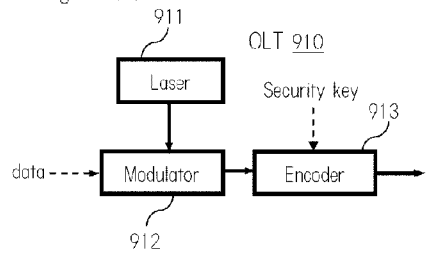
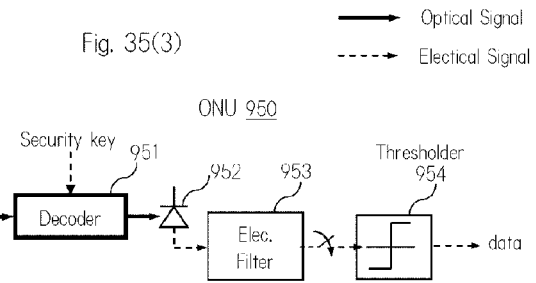
Fig. 35
(prior art)

OPTICAL MULTIPORT SPECTRAL PHASE ENCODER

TECHNICAL FIELD

The present invention generally relates to an optical device, and in particular to an optical device capable of simultaneously generating and processing optical spectral phase codes.

BACKGROUND ART

In recent years, demand for high-performance Internet protocol (IP) networks that are able to support a large throughput and ensure high-quality services for a large number of users has been increasing.

One of the solutions is the use of optical networking which provides fast data transmission, enables dynamic resource provisioning, and realizes high scalability. While multiprotocol label switching (MPLS) system has been proposed and standardized by IETF (Internet Engineering Task Force) to increase scalability and flexibility of the whole network, a solution for managing MPLS networks directly in the optical domain using multi protocol wavelength switching or multi-protocol lambda switching (MPL(lamda)S) has been introduced. The MPL(lambda)S is also called a generalized MPLS (GMPLS) when optical codes are used as labels.

On the other hand, the optical code division multiple-access (OCDMA) technology has been receiving increased attention due to its capability of realizing not only a super-high speed and very large capacity communication but also a flexible and secure network with highly confidentiality. At the present, OCDMA based passive optical networks (PON) are receiving increasing interest thanks to their unique features of asynchronous access, fast re-configurability, and high confidentiality. In the OCDMA transmission, every user is provided with a security key which is called an optical code. The optical code is used to encode every bit of communication data, so that multiplexing signals in the same wavelength at the same time is enabled.

In particular, the CDMA technique assigns a specific optical code to each user, code which is independent of the information signal to be transmitted. The encoding operation, called spreading, consists of multiplying the code assigned to each single user by the information signal. Instead, in the decoding operation, the receiver carries out a correlation between the received signal and the code of the user which is intended to be received (despreading). Therefore, in order to avoid interference among the various users simultaneously accessing to the network, it is necessary that the codes are orthogonal with respect to each other.

In both GMPLS system and OCDMA system, the code cardinality, i.e. the number of labels, is one of the issues to be considered. Furthermore, in order to enable accurate performances for routers of a GMPLS network and to ensure accurate detection in an OCDMA system, it is necessary to precisely distinguish the different optical codes, which requires that the peak of the auto-correlation function is as high as possible whereas the cross-correlation function must be close to zero everywhere. In order to enable code generation and processing directly in the optical domain in an accurate, reliable, simple, and inexpensive way, and in order to provide a set of optical codes which are highly orthogonal, a multiport encoder/decoder (E/D) capable of generating/processing N phase shifted keying (PSK) codes simultaneously is disclosed in WO2005/064834 by the inventors of the present invention et al (see e.g. Patent Citation 1).

Also, the inventors of the present invention introduced an E/D having an arrayed waveguide grating (AWG) configuration, and when a single laser pulse is sent into one of the encoder input ports, N optical codes are generated at the encoder outputs (see e.g. Non Patent Citations 1 and 2).

In the above-mentioned Patent Citation 1 and Non Patent Citations 1 and 2, a multidimensional E/D is also disclosed. The multidimensional E/D can increase the code cardinality without increasing the code length. For example, if two or more simultaneous laser pulses are driven into different device inputs, N orthogonal codes are generated. Since each different combination of input pulses generates a different set of N codes, the number of orthogonal codes that the device can generate/process can be largely increased.

According to the above-mentioned Patent Citation 1 and Non Patent Citations 1 and 2, the code cardinality of the set of codes generated by the multidimensional E/D is described as follows:

Called n the number of inputs into which a pulse is sent, with n<N, the cardinality of the set of generated codes increases up to

[Math. 1]

$$\binom{N}{n}$$

whereas the code length remains equal to N. The maximum number of OCs of length N which may be generated by using a multidimensional configuration is equal to

[Math. 2]

$$\binom{N}{N/2}$$

which is obtained by considering n=N/2 inputs.

By way of example, with N=8 ports, the code cardinality of 4-dimensional OCs is 70. As for a device with N=100 ports, and n=50 input pulses, more than $10^{29}$ different codes can be obtained. While the code cardinality of the multidimensional E/D seems to be large enough for a secure communication, it is not so.

In order to describe the reason why, an eavesdropping in a passive optical network will now be considered as an example.

Passive optical networks (PONs) are a cost-effective solution to the growing demand for broadband communication services from residential and business costumers, as they promise very high bit rates, broad application supports and enhanced flexibility.

However, their weak point is the lack of confidentiality, because in standard PONs, the downstream data is broadcasted, and all the optical network units (ONU)s receive the same information from the optical line terminal (OLT).

FIG. 35(1) is a schematic diagram of a PON 900 which is composed of an optical line terminal (OLT) 910, an optical splitter 930 connected to the OLT 910 with an optical fiber 920, and optical network units (ONUs) 950 connected to the optical splitter 930 with optical fibers 940. As shown in FIG. 35(1), the OLT 910 broadcasts the downstream data indicated by solid line arrows. The optical splitter splits the data to be distributed to all the ONUs 950.

FIG. 35(2) is a block diagram of the OLT 910 which is composed of a laser source 911, a modulator 912, and an optical encoder 913. A dotted line arrow represents an electrical signal and a solid line arrow represents an optical signal. When a laser light from the laser source 911 and electric data is provided, the modulator 912 of the OLT 910 modulates the laser light with the data and provides a modulated signal to the encoder 913. The encoder 913 encodes the received signal using a security key provided externally and outputs an encoded signal.

FIG. 35(3) is a block diagram of the ONU 950 which is composed of a decoder 951, a photodetector 952, an electric filter 953, and a thresholder 954. The decoder 951 decodes the signal using a security key and provides the decoded signal to the photodetector 952. Output of the photodetector 952 passes through the electric filter 953 and the thresholder 954 and the data is reproduced. While only the ONUs 950 provided with a matched decoder 951 is supposed to recognize the signal, an eavesdropper who taps the communication as shown in FIG. 35(1) can recognize the signal if the eavesdropper has a matched decoder.

Meanwhile, the CDMA has proven to be a secure transmission technique, since each user encrypts a plaintext message into a ciphertext. Therefore, PONs using electronic and optical CDMA has been considered. Moreover, the optical code division multiplexing (OCDM) has the advantage to encrypt data at a very high data rate, using only passive optical devices that can be also easily reconfigured when the secret key must be updated.

Namely, the OCDM technique can be applied to the OLT 910 and the ONUs 940. By applying the multi-dimensional E/D discussed above, a large code cardinality can be provided.

For example, FIGS. 36(1) and 36(2) respectively shows the multidimensional coding and decoding processes at an OLT 960 and an ONU 970, respectively, where the multi-dimensional E/D is applied.

The OLT 960 shown in FIG. 36(1) is composed of a laser light source 961, two modulators 962 and 963, two 1×N/2 splitters 964 and 965, a nonblocking switch 966, and an E/D 967.

On the other hand the ONU 970 shown in FIG. 36(2) is composed of an E/D 971, photodetectors 972, and an electronic logic circuit 973 for code recognition.

For sake of simplicity, we assume that the first N/2 ports of the encoder are used to transmit a '0', and the remaining ones are used for a logic '1'. At the OLT 960, a laser light from the laser light source 961 is provided to the modulators 962 and 963.

Data '011100' and inverted data '100011' are provided to the modulators 962 and 963, respectively, so that laser pulses are provided to the two 1×N/2 splitters 964 and 965. The laser pulses are switched between two 1×N/2 splitters 964 and 965, according to the bit value. The optical nonblocking switch 966 is driven by the security key and connects n ports of the encoder with the input pulses, selecting a n dimensional code.

At the ONU 970, the n ACPs (autocorrelation peaks) detected by the photodetectors 972 at the output ports identify the n-dimensional code and the electronic logic circuit 973 converts this information in the received bit. This encoding technique is known as code shift keying (CSK), in the case of n=2 and it also allows balanced detection to reduce MAI noise.

However, an eavesdropper that possesses a matched decoder can easily intercept the code. Furthermore, a spectral analysis of the received signal, using an optical spectrum analyzer (OSA), can also identify the code, because the n-dimensional codes are superposition of n different frequency subbands.

Although the security the security OCDM transmission should not rely on the coding/decoding processes of a single E/D, because an adversary could be able to find the matched decoder, but it is necessary to introduce more degrees of freedom to prevent that this could happen.

Patent Citation 1: WO2005/064834
Non Patent Citation 1: G. Cincotti, N. Wada, and K.-i. Kitayama 'Characterization of a full encoder/decoder in the AWG configuration for code-based photonic routers. Part I: modelling and design,' IEEE J. Lightwave Technol., vol. 24, n. 1, in press 2006.
Non Patent Citation 2: N. Wada, G. Cincotti, S. Yoshima, N. Kataoka, and K.-i. Kitayama 'Characterization of a full encoder/decoder in the AWG configuration for code-based photonic routers. Part II: experimental results' IEEE J. Lightwave Technol., vol. 24, n. 1, in press 2006

DISCLOSURE OF INVENTION

Technical Problem

The multiport encoder/decoder in the Patent Citation 1 and Non Patent Citations 1 and 2, presents two weak points. The first one is the lack of confidentiality. The second one is code performance.

An object of the present invention is to obtain sharp-peak autocorrelation signal to improve code performance.

Another object of the present invention is to increase the data security of a multidimensional code system.

Technical Solution

The present invention basically is based on a new concept that inserting phase shifters along the waveguide which connect between splitter and slab makes autocorrelation signal sharp, because the splitter recombines all the frequency subbands corresponding to the different output ports of the multiport encoder/decoder.

Another new concept is that code signals can have various phases because of the inserted phase shifters and then data security of a multi-dimensional code system is increased.

The first aspect of the present invention is directed to an optical device. The optical Device (100) comprises an input port (Pi); a splitter (SP) splitting an input light from the input port (Pi) into a plurality of lights; a plurality of waveguides connected with the splitter (SP), each of the split lights passing on each of the waveguides; a plurality of phase shifters (PS), inserted along with each of the waveguides, wherein each of phase shifters (PS) is capable of shift the light split by the splitter (SP); a multi-port encoder/decoder (E/D), the multi-port encoder/decoder (E/D) being connected with all of the waveguides, all of the light from the phase shifters (PS) being input into the multi-port encoder/decoder (E/D), wherein the multi-port encoder/decoder (E/D) generates spectral encoded codes; and a plurality of output ports (Po), the output ports (Po) being connected with the multi-port encoder/decoder (E/D), the output ports (Po) outputting the spectral encoded codes generated by the multi-port encoder/decoder (E/D).

Because the optical device comprises the phase shifters, the optical device can make autocorrelation signal sharp data security of a multi-dimensional code system is increased. The phase shifters are driven by driving device. Driving signals are controlled by, e.g., a controller. The controller controls the driving signals so that the transfer function of the input guide becomes efficient one.

The optical device is preferred when the input port (Pi), the splitter (SP), the waveguides, the phase shifters (PS), the multi-port encoder/decoder (E/D), and the output ports (Po) are fabricated on a same substrate.

The optical device is preferred when the multi-port encoder/decoder (E/D) comprising: a first coupler, the first coupler being a slab coupler, the first coupler having a plurality of input waveguides, each of the input waveguides being connected with the phase shifter (PS); a second coupler, the second coupler being a slab coupler, the second coupler having a plurality of output waveguides, each of the output waveguides being connected with the output ports (PS); and a plurality of connecting waveguides, the connecting waveguides connecting the first coupler and the second coupler, each of the connecting waveguides differs its length.

As shown in FIGS. 2, 3, and 4, using two slab couplers, the E/D can obtain sharp spectrums.

The optical device is preferred when the optical device generates simultaneously N spectral encoded optical codes, and wherein the multi-port encoder/decoder (E/D) meats the following equation.

[Math. 3]

$$N = \frac{\lambda R}{n_s d d_o} \quad [47]$$

wherein lambda is wavelength of light input into the multi-port encoder/decoder (E/D), R is the slab focal length of the first coupler and the second coupler, $n_s$ is the effective refractive index of the first coupler and the second coupler, d is the pitches of the connecting waveguides, and $d_o$ is the pitches of the input waveguides and output waveguides.

Because the E/D is designed based on the above, the transfer function of the input waveguide become an effective value and spectrums obtained by the optical device become sharp.

Preferred optical device is any optical devices according to the above,
wherein the number of the input waveguides is P,
wherein the number of the output waveguides is P',
wherein the N is equal or larger than 2,
wherein the P is equal or larger than 1,
wherein the P' is equal or larger than 1,
and the transfer function $H_k(f)$ from one of the input waveguides to the kth output waveguides (k is equal to 1 or larger than 1 and equal to P' or smaller than P') satisfies the following formula:

[Math. 4]

$$H_k(f) = \sum_{i=0}^{N'-1} A_k e^{-j\Phi_i} H\left(a_k f - \frac{S_{ki}}{N_k \tau}\right)$$

where
k satisfies $1 \leq k \leq P'$,
P' is the number of output ports,
N' is an integer number $\geq 2$,
$N_k$ is an integer number for $1 \leq k \leq P'$,
$S_{ki}$ is an integer number,
$A_k$ is a constant value for $1 \leq k \leq P'$, $a_k$ is a constant value for $1 \leq k \leq P'$,
H(f) is the transfer function of an optical filter,
$\Phi_i$ is a constant phase value,
j bar is the imaginary unit equal to $(-1)^{1/2}$, and
τ is a constant value.

Preferred optical device is any optical devices according to the above, characterized in that the $N_k$ and the N is the same integer number.

Preferred optical device is any optical devices according to the above, characterized in that the number of input port (Pi) is equal to 1, namely P is equal to be 1.

Preferred optical device is any optical devices according to the above, characterized in that the $a_k$ is equal to be 'a' which is a constant value.

Preferred optical device is any optical devices according to the above, characterized in that the $N_k$ is the same as the number of the output ports, P'.

Preferred optical device is any optical devices according to the above, characterized in that the $S_{ki}$ is equal to be i+k+1, namely $S_{ki}$=i+k+1.

Preferred optical device is any optical devices according to the above, characterized in that the N' is equal to the number of the output ports, namely the N' is equal to be the P'.

Preferred optical device is any optical devices according to the above, wherein the transfer function is represented by the following formula:

[Math. 5]

$$H(f) = \sum_{j=0}^{N-1} e^{-j\pi(2j-N+1)f\tau}$$

Preferred optical device is any optical devices according to the above, wherein the transfer function has a Free Spectral Range equal to 1/tau, and wherein the transfer function is represented by the following formula:

[Math. 6]

$$H(f) = H\left(f - \frac{1}{\tau}\right)$$

Preferred optical device is any optical devices according to the above, wherein the values of the constant phase value are equal to zero and the transfer function $H_k(f)$ is represented by the following formula:

[Math. 7]

$$H_k(f) = \sum_{i=0}^{P'-1} H\left(f - \frac{k+i+1}{P'\tau}\right)$$

Preferred optical device is any optical devices according to the above, characterized in that the $A_k$ is equal to be 'A' which is a constant value.

Preferred optical device is any optical devices according to the above, wherein the values of the constant phase value are a maximum length sequence, and the autocorrelation between the phases is represented by the following formula:

[Math. 8]

$$\rho_k = \sum_{i=0}^{N'-1} e^{-\bar{j}\Phi_i} e^{-\bar{j}\Phi_{i+k}} = \begin{cases} 1 & k=0 \\ 1/N' & 1 \le k \le N'-1 \end{cases}$$

Another optical device of the present invention comprises:
a plurality of waveguides;
a plurality of phase shifters (PS), inserted along with each of the waveguides, wherein each of phase shifters (PS) is capable of shift the light propagating each of the waveguides;
a multi-port encoder/decoder (E/D), the multi-port encoder/decoder (E/D) being connected with all of the waveguides, all of the light from the phase shifters (PS) being input into the multi-port encoder/decoder (E/D), wherein the multi-port encoder/decoder (E/D) generates spectral encoded codes; and
a plurality of output ports (Po), the output ports (Po) being connected with the multi-port encoder/decoder (E/D), the output ports (Po) outputting the spectral encoded codes generated by the multi-port encoder/decoder (E/D).

The above optical device can comprise any feature of the above described optical devices. The input ports of the above optical device is not limited to be one.

Another optical device comprises:
an input port (Pi);
a splitter (SP) splitting an input light from the input port (Pi) into a plurality of lights;
a plurality of waveguides connected with the splitter (SP), each of the split lights passing on each of the waveguides;
a plurality of attenuators, inserted along with each of the waveguides, wherein each of attenuators is capable of attenuate the light split by the splitter (SP);
a multi-port encoder/decoder (E/D), the multi-port encoder/decoder (E/D) being connected with all of the waveguides, all of the light from the attenuators being input into the multi-port encoder/decoder (E/D), wherein the multi-port encoder/decoder (E/D) generates spectral encoded codes; and
a plurality of output ports (Po), the output ports (Po) being connected with the multi-port encoder/decoder (E/D), the output ports (Po) outputting the spectral encoded codes generated by the multi-port encoder/decoder (E/D).

The above described optical devices are used in an optical packet switching device.

The above described optical devices are used in an optical burst switching device.

The above described optical devices are used in an OCDMA device.

The above described optical devices are used in an MLPS device.

The present invention refers also a set of optimal phase values, that can be chosen as a maximal sequence length. In fact, when the device is used to transmit OCDMA signals, different OCDMA users are transmitting simultaneously and it is important to distinguish the different codes, i.e. reduce the multiple access interference noise. The crosscorrelation between two codes generated at the port k and k' can be evaluated both in the time on in the frequency domain; in the latter case, it is

[Math. 9]

$$C_k(t) * C_{k'}(t) =$$

$$\int \sum_{i=0}^{N-1} e^{-\bar{j}\Phi_i} H\left(f - \frac{i+k+1}{N\tau}\right) \cdot \sum_{i'=0}^{N-1} e^{-\bar{j}\Phi_{i'}} H\left(f - \frac{i'+k'+1}{N\tau}\right) e^{-j2\pi ft} df$$

If we assume that the optical subband filter overlap only if i+k=i'+k', the previous expression can be simplified as

[Math. 10]

$$C_k(t) * C_{k'}(t) = \sum_{i=0}^{N-1} e^{-\bar{j}\Phi_i} \cdot e^{-\bar{j}\Phi_{i+k-k'}} \int H_k^2\left(f - \frac{i+k+1}{N\tau}\right) e^{-j2\pi ft} df$$

If k=k', this expression coincides with the autocorrelation signal.

The term

[Math. 11]

$$\sum_{i=0}^{N-1} e^{-\bar{j}\Phi_i} \cdot e^{-\bar{j}\Phi_{i+k-k'}}$$

can be seen as the correlation of the two phase shift values

[Math. 12]

$$\sum_{i=0}^{N-1} e^{-\bar{j}\Phi_i} \cdot e^{-\bar{j}\Phi_{i+k-k'}} = \rho_{k-k'}$$

and if they are a maximal length sequence, then it is

[Math. 13]

$$\sum_{i=0}^{N-1} e^{-\bar{j}\Phi_i} \cdot e^{-\bar{j}\Phi_{i+k-k'}} = \rho_{k-k'} = \begin{cases} 1 & k=k' \\ 1/N & 1 \le k-k' \le N-1 \end{cases}$$

In this case, the crosscorrelation, for k not equal to k' becomes

[Math. 14]

$$C_k(t) * C_{k'}(t) = \sum_{i=0}^{N-1} \frac{1}{N} \int H_k^2\left(f - \frac{i+k+1}{N\tau}\right) e^{-j2\pi ft} df$$

and it is minimum.

The preferred aspect of the present invention directs to an optical device apt to process and generate simultaneously N spectral encoded optical codes, comprising P inputs, and P' outputs, characterized in that the N is equal or larger than 2, P is equal or larger than 1, P' is equal or larger than 1, and the transfer function $H_k(f)$ from one of the inputs to the output k (k is equal to 1 or larger than 1 and equal to P' or smaller than P') satisfies the following formula:

[Math. 15]

$$H_k(f) = \sum_{i=0}^{N'-1} A_k e^{-\bar{j}\Phi_i} H\left(a_k f - \frac{S_{ki}}{N_k \tau}\right)$$

where
k satisfies 1≤k≤P',
P' is the number of output ports,

N' is an integer number≥2,
$N_k$ is an integer number for $1 \leq k \leq P'$,
$S_{ki}$ is an integer number,
$A_k$ is a constant value for $1 \leq k \leq P'$,
$a_k$ is a constant value for $1 \leq k \leq P'$,
H(f) is the transfer function of an optical filter,
$\Phi_i$ is a constant phase value,
j bar is the imaginary unit equal to $(-1)^{1/2}$, and
τ is a constant value.

A preferred embodiment of the preferred aspect of the present invention related to the device according to the above, characterized in that the $N_k$ and the N is the same integer number, where N is an integer number. A preferred embodiment of the preferred aspect of the present invention related to the device according to the above, characterized in that the $N_k$ and the N is the same integer number, where N is an integer number.

A preferred embodiment of the preferred aspect of the present invention related to the device according to the above, characterized in that the number of input ports is equal to 1, namely P is equal to be 1.

A preferred embodiment of the present invention related to the device according to the above, characterized in that the $a_k$ is equal to be 'a' which is a constant value.

A preferred embodiment of the present invention related to the device according to the above, characterized in that the $N_k$ coincides with the number of the output ports, P'.

A preferred embodiment of the present invention related to the device according to the above, characterized in that the $S_k$ is equal to be i+k+1, namely $S_{ki}$=i+k+1.

A preferred embodiment of the present invention related to the device according to the above, characterized in that the N' is equal to the number of the output ports, namely the N' is equal to be the P'.

A preferred embodiment of the present invention related to the device according to the above, wherein the transfer function of the optical filter is represented by the following formula:

[Math. 16]

$$H(f) = \sum_{j=0}^{N-1} e^{-\bar{j}\pi(2j-N+1)f\tau} \quad [2]$$

A preferred embodiment of the present invention related to the device according to the above, wherein the transfer function of the optical filter has a Free Spectral Range equal to 1/t(tau), and the transfer function of an optical filter is represented by the following formula:

[Math. 17]

$$H(f) = H\left(f - \frac{1}{\tau}\right) \quad [3]$$

A preferred embodiment of the present invention related to the device according to the above, wherein the values of the phases are equal to zero and the transfer function $H_k(f)$ is represented by the following formula:

[Math. 18]

$$H_k(f) = \sum_{i=0}^{P'-1} H\left(f - \frac{k+i+1}{P'\tau}\right) \quad [4]$$

A preferred embodiment of the present invention related to the device according to the above, characterized in that the $A_k$ is equal to be 'A' which is A constant value.

A preferred embodiment of the present invention related to the device according to the above, wherein the values of the phases are a maximum length sequence, and the autocorrelation between the phases is represented by the following formula:

[Math. 19]

$$\rho_k = \sum_{i=0}^{N'-1} e^{-\bar{j}\Phi_i} e^{-\bar{j}\Phi_{i+k}} = \begin{cases} 1 & k = 0 \\ 1/N' & 1 \leq k \leq N'-1 \end{cases} \quad [5]$$

If the codes are used in a packet switching, any combination of phase shift values can be selected. The lowest autocorrelation corresponds to a phase distribution where N/2 phases are 'pai', and the rest are '0'. But good performance can be obtained with random phases, with values that can vary in the range 0, 2(pai). This would increase largely the confidentiality, because the number of different combinations of phases is very large. In the case of OCDMA, the spectral encoding technique always request that two codes do not overlap. For this reason, phases according to a MLS are selected so that codes are orthogonal.

A preferred embodiment of the present invention related to an optical packet switching device comprising the optical device according to any one of the above optical devices.

A preferred embodiment of the present invention related to an optical burst switching device comprising the optical device according to any one of the above optical devices.

A preferred embodiment of the present invention related to an optical communications device for OCDMA comprising the optical device according to any one of the above optical devices.

Another aspect of the present invention is related to an optical device (100) comprising:
an input port (Pi);
a splitter (SP) splitting an input light from the input port into a plurality of lights;
a plurality of waveguides connected with the splitter on which each of the split lights passes;
a plurality of phase shifters (PS), which are inserted along the waveguides from the splitter, each of which shifts light split by the splitter (SP);
a multi-port encoder/decoder (E/D), into which the light from the phase shifters (PS) are input, and which generates spectral encoded codes; and
a plurality of output ports (Po) outputting the spectral encoded codes generated by the multi-port encoder/decoder (E/D).

This invention can incorporate all of the features of the above-described invention. Preferably, the optical device of the present invention comprises one or a plurality of phase shifter drivers which drive a plurality of phase shifters. Further, phase shifters can arbitrarily modify a phase of light, which is controlled by the drivers.

If phase shift values of the phase shifters are fixed, a set of different codes, one for each device output port can be generated/processed. But, if the values of the phase shifters are changed, new codes that are orthogonal to the previous set can be generated/processed. Since the phase shift can be chosen arbitrarily, a very large number of orthogonal codes can be generated, and therefore the system security is much improved.

The prior art device was very weak against an eavesdropper attack, and the system confidentiality could be easily broken by a simple frequency analysis. According to the second aspect of the present invention, the codes are generated in the same way as the spread spectrum technique, and only the exact knowledge of the phase shift values allow correct code detection. Furthermore, the system flexibility is increased since the value of phase shifter could represent a multicast group.

A preferred embodiment of the present invention is related to the above optical device, wherein the optical device generate simultaneously N spectral encoded optical codes, comprising P inputs, and P' outputs, characterized in that the N is equal or larger than 2, P is equal or larger than 1, P' is equal or larger than 1, and the transfer function $H_k(f)$ from one of the inputs to the output k (k is equal to 1 or larger than 1 and equal to P' or smaller than P') satisfies the following formula:

[Math. 20]

$$H_k(f) = \sum_{i=0}^{N'-1} A_k e^{-\bar{j}\Phi_i} H\left(a_k f - \frac{S_{ki}}{N_k \tau}\right)$$

where
k satisfies $1 \leq k \leq P'$,
P' is the number of output ports,
N' is an integer number $\geq 2$,
$N_k$ is an integer number for $1 \leq k \leq P'$,
$S_{ki}$ is an integer number,
$A_k$ is a constant value for $1 \leq k \leq P'$,
$a_k$ is a constant value for $1 \leq k \leq P'$,
H(f) is the transfer function of an optical filter,
$\Phi_i$ is a constant phase value,
j bar is the imaginary unit equal to $(-1)^{1/2}$, and
τ is a constant value.

A preferred embodiment of the present invention is related to the above optical device, wherein the input port (Pi), the splitter (SP), the waveguides, the phase shifters (PS), the multi-port encoder/decoder (E/D), and the output ports (Po) are fabricated on a same substrate. By fabricating the constituent elements on a same substrate, a beating effect can be avoided. A preferred embodiment of the present invention is related to the above optical device, wherein the optical device is passive and reciprocal. Namely, the input port and the output ports of the above optical device can be made an output port and input ports, respectively. This will enable the same device to be used for encoding and decoding.

A preferred embodiment of the present invention is related to the above optical device, wherein the multi-port encoder/decoder (E/D) comprising: a first coupler having a plurality of input waveguides which are connected with each of the phase shifters (PS), and a plurality of output waveguides; and the second coupler having a plurality of input waveguides which are connected with the output waveguides of the first coupler, and output waveguides which are connected with the output ports. The multi-port encoder/decoder is produced using well known technique and could attain sharp-peak autocorrelation signal.

A preferred embodiment of the present invention is related to the above optical device, wherein the values of the phases are a maximum length sequence.

Namely, the values of the phases are controlled or modified to be a maximum length sequence. In this case the autocorrelation between the phases is:

[Math. 21]

$$\rho_k = \sum_{i=0}^{N'-1} e^{-\bar{j}\Phi_i} e^{-\bar{j}\Phi_{i+k}} = \begin{cases} 1 & k = 0 \\ 1/N' & 1 \leq k \leq N'-1 \end{cases}$$

If the codes are used in a packet switching, any combination of phase shift values can be selected. The lowest autocorrelation corresponds to a phase distribution where N/2 phases are pai, and the rest are 0. But good performance can be obtained with random phases, with values that can vary in the range 0, 2 pai. This would increase largely the confidentiality, because the number of different combinations of phases is very large.

In the case of OCDMA; the spectral encoding technique always request that two codes do not overlap. For this reason, phases according to a MLS are selected so that codes are orthogonal.

A preferred embodiment of the present invention is an optical device according to any one of the above comprising: an input port (Pi); a splitter (SP) splitting an input light from the input port into a plurality of lights; a plurality of waveguides connected with the splitter on which each of the split lights passes; a plurality of phase shifters (PS), which are inserted along the waveguides from the splitter, each of which shifts light split by the splitter (SP); a plurality of attenuators, which are inserted along the waveguides from the splitter, each of which shifts light split by the splitter (SP); a multi-port encoder/decoder (E/D), into which the light from the phase shifters (PS) are input, and which generates spectral encoded codes; and a plurality of output ports (Po) outputting the spectral encoded codes generated by the multi-port encoder/decoder (E/D).

A preferred embodiment of the present invention is an optical packet switching device comprising the optical device as described above. A preferred embodiment of the present invention is an optical burst switching device comprising the optical device as described above. A preferred embodiment of the present invention is an optical communications device for OCDMA comprising the optical device as described above.

The still another aspect of the present invention is related to an optical code generating device comprising:

a laser light source;

one or a plurality of modulators for modulating a laser light from the laser light source;

one or a plurality of splitters for splitting the modulated light outputted by the modulator(s);

a plurality of phase shifters (PS), which are inserted along the waveguides from the splitter(s), each of which shifts light split by the splitter (SP);

a multi-port encoder/decoder (E/D), into which the light from the phase shifters (PS) are input, and which generates spectral encoded codes; and a plurality of output ports (Po) outputting the spectral encoded codes generated by the multi-port encoder/decoder (E/D).

A preferred embodiment of the present invention is related to the above optical code generating device, wherein the security key is a pseudo-random binary phase code.

A preferred embodiment of the present invention is related to the above optical device, wherein the optical device generates simultaneously N spectral encoded optical codes, comprising P inputs, and P' outputs, characterized in that the N is equal or larger than 2, P is equal or larger than 1, P' is equal or larger than 1, and the transfer function $H_k(f)$ from one of the inputs to the output k (k is equal to 1 or larger than 1 and equal to P' or smaller than P') satisfies the following formula:

[Math. 22]

$$H_k(f) = \sum_{i=0}^{N'-1} A_k e^{-\bar{j}\Phi_i} H\left(a_k f - \frac{S_{ki}}{N_k \tau}\right)$$

where
k satisfies $1 \leq k \leq P'$,
P' is the number of output ports,
N' is an integer number$\geq 2$,
$N_k$ is an integer number for $1 \leq k \leq P'$,
$S_{ki}$, is an integer number,
$A_k$ is a constant value for $1 \leq k \leq P'$,
$a_k$ is a constant value for $1 \leq k \leq P'$,
H(f) is the transfer function of an optical filter,
$\Phi_i$ is a constant phase value,
j bar is the imaginary unit equal to $(-1)^{1/2}$, and
$\tau$ is a constant value.

Advantageous Effects

The multiport encoder/decoder in the Patent Citation 1 and Non Patent Citations 1 and 2, presents two week points. The first one is the lack of confidentiality. In fact, although the number of the codes that can be generated in a multidimensional configuration is very high, an eavesdropper that possesses the multiport encoder/decoder can be easily recognize the multidimensional code. Therefore, in the present invention, a set of phase shifters are added at the encoder/decoder ports so that the multidimensional codes are first phase shifted and then summed. In this new configuration, we had a degree of freedom to the optical code generation, and since the values of the phase shifter can be chosen arbitrary, an eavesdropper that possesses the same device, but does not know the phase shift values cannot recognize the code.

The second advantage of the present invention, with respect to the multiport encoder/decoder in the Patent Citation 1 and Non Patent Citations 1 and 2, is the fact that this new device is able to decode an optical code, generating a sharp-peak autocorrelation signal. This property largely enhance the system performance, because it is possible in this case to use time gating or thresholding. In addition the cascade-ability of the encoder/decoder is also feasible with this configuration, because the auto-correlation signal basically coincides with the input laser pulse that generates all the codes. This property descends from the fact that the present invention combines together all the multidimensional codes generated by the multiport encoder/decoder, therefore the spectrum of the output pulse has the same frequency content of the input laser pulse.

The present invention refers also to the optimal values of the phase shifters that have to be chosen to reduce the multiple access noise, that have to be selected as a maximal length sequence. This property largely reduces the MAI noise, as it is shown in FIG. 34.

According to the present invention, sharp-peak autocorrelation signal is obtained and the code performance is improved.

According to the present invention, the use of phase shifters allows choices of arbitrary phase shift values, so that the code cardinality of a multi-dimensional code system is increased, and therefore the data security of a multi-dimensional code system is increased.

BRIEF DESCRIPTION OF THE DRAWINGS

FIGS. 5(1) and 5(2) schematically show a MPLS network and a CDMA network, respectively;

FIGS. 8(1) and 8(2) show the application of the device of FIG. 7, respectively, as label generator in a MPLS network and as encoder in a CDMA network;

FIGS. 14(1) and 14(2) show the application of the device of FIG. 11, respectively, in a MPLS network and in a CDMA network;

FIG. 19 shows an arrangement of a code-based photonic router in which the examples (1)-(6) are used;

FIGS. 20(1) and 20(2) respectively show code generation and code recognition using an example (6) an encoder/decoder used in an optical device according to the invention;

FIGS. 22(1) and 22(2) respectively show arrangements of an OLT and an ONU in a multi-code OCDM system with a standard multi-port encoder/decoder is applied;

FIGS. 23(1) and 23(2) respectively show arrangements of an OLT and an ONU in a multi-code OCDM system where a block cipher cryptography scheme is applied;

FIGS. 25(1)-25(4) respectively show code generation scheme in terms of time-domain and frequency domain of a conventional encoder/decoder and an optical device according to the invention;

FIGS. 35(1)-35(3) respectively show arrangements of a conventional PON, an OLT, and ONU.

BEST MODE FOR CARRYING OUT THE INVENTION

Figure 1:
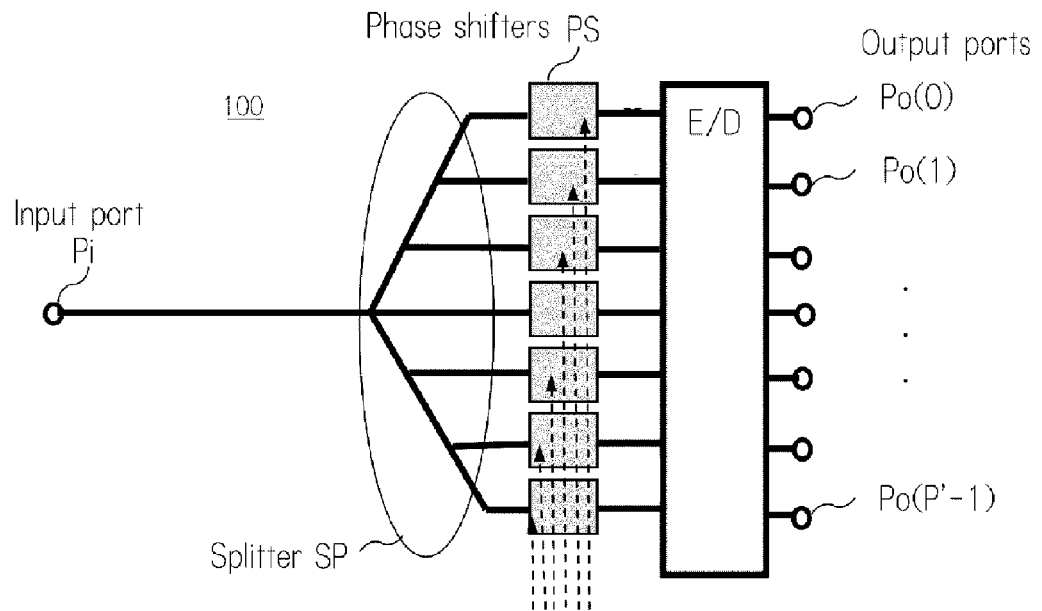
FIG. 1 schematically shows a principle of an optical device according to the present invention.

The invention refers to an optical device with a single or multiple inputs Pi and two or more outputs Po, that is able to generate two or more spectral phase codes, as illustrated in FIG. 1. The invention is based on a multiport encoder/decoder that has the following functionality: when a short laser pulse is sent to any input port of a multiport encoder/decoder, different optical codes are generated at the encoder/decoder output ports. If two or more laser pulses are sent into two or more different input ports of the multiport encoder/decoder, a set of multidimensional codes are generated at the encoder/decoder output ports.

In the present invention, the multiport encoder/decoder is used in a multidimensional configuration, by sending simultaneously a set of laser pulses at its input ports. The input pulse is split in as many copies as the number of the input ports of the multiport encoder/decoder, so that a copy of the input pulse reaches all the input ports of the multiport encoder/decoder, and a set of multidimensional codes are generated at the its output ports. Furthermore, using phase shifters inserted at the end of the splitter, we change the phases to the copies of the input pulse, and we generate phase shifted multidimensional codes.

To better explain the functionality of the optical device, we can consider the reciprocal configuration, where the input port Pi is used as output port, and the output ports Po as device inputs. The device is passive and reciprocal, and it can be used in both configurations, according to the system requirement, If a single laser pulse is sent into any one of ports Po, the multiport encoder/decoder generates different codes at its output ports. These codes are phase shifted and then summed by using the splitter to generate a spectral phase code at the port Pi. In fact, the codes generated by the multiport encoder/decoder have the property that in they frequency domain they correspond to different frequency channels; with this configuration, the output from each channel is phase shifted and then summed together to obtain a spectral phase code. The present invention is an efficient and flexible way to generate spectral phase optical codes: in fact if we send a single laser pulse to a different multiport encoder/decoder port Po, we generate a different spectral phase code.

Each code generated by the multiport encoder decoder corresponds to a shifted version of a subband optical filter H(f), that has a FSR equal to 1/t(tau). Therefore, the transfer function from the input i to the output k of the multiport encoder/decoder with N input ports and N output ports, i.e. the Fourier transform of the code, can be written as

[Math. 23]

$$H\left(f - \frac{i+k+1}{N\tau}\right).$$

If we add a phase shift to each code, i.e, we multiply each code by

[Math. 24]

$$e^{-j\Phi_i}$$

and we sum all the codes, we obtain

[Math. 25]

$$H_k(f) = \sum_{i=0}^{N-1} e^{-j\Phi_i} H\left(f - \frac{i+k+1}{N\tau}\right) \quad [6]$$

This is the transfer function of the spectral phase encoder that is the object of the present invention, and it can be fabricated using a multiport encoder/decoder, to generate all the functions

[Math. 26]

$$H\left(f - \frac{i+k+1}{N\tau}\right),$$

a set of phase shifters, to multiply each code by

[Math.27]

$$e^{-j\Phi_i}$$

and a splitter to sum all the codes.

The present invention also includes more general cases: when the subband optical filters have different FSR, i.e when their transfer function is H($a_k$f) (k=0, 1, N−1); when the unitary frequency shift of each subband filter is different

[Math. 28]

$$H\left(f - \frac{i+k+1}{N_k \tau}\right)$$

(k=0, 1, N−1); when not all the codes are summed (N' does not coincides with N), and when the number of the ports of the multiport encoder/decoder P' does not coincides with N.

Finally, we also consider the possibility to insert attenuators before phase shifters, that can be represented by the parameter $A_k$ in the formula

[Math. 29]

$$H_k(f) = \sum_{i=0}^{N-1} A_k e^{-j\Phi_i} H\left(f - \frac{i+k+1}{N\tau}\right) \quad [7]$$

1. Optical Device

As shown in the FIG. 1, an example of an optical device according to the present invention comprising: an input port (Pi); a splitter (SP) splitting an input light from the input port into a plurality of lights; a plurality of waveguides connected with the splitter on which each of the split lights passes; a plurality of phase shifters (PS), which are inserted along the waveguides from the splitter, each of which shifts light split by the splitter (SP); a multi-port encoder/decoder (E/D), into which the light from the phase shifters (PS) are input, and which generates spectral encoded codes; and a plurality of output ports (Po) outputting the spectral encoded codes generated by the multi-port encoder/decoder (E/D). In other words, the optical device as depicted in FIG. 1 comprises an input port (Pi), a splitter (SP), phase shifters (PS), a multi-port encoder/decoder (E/D), and output ports (Po).

Figure 2:
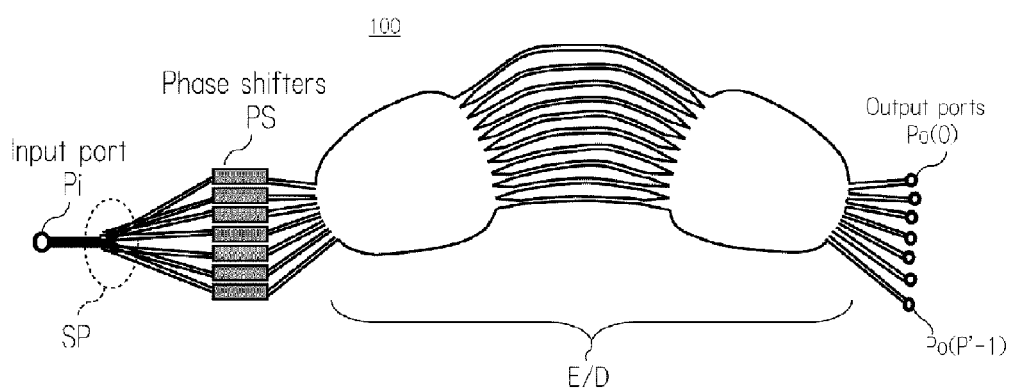
FIG. 2 schematically shows an example of an optical device according to the present invention fabricated on a single substrate.

Another example of an optical device according to the present invention is shown in FIG. 2. An optical device 100 is composed of an input port (Pi), a splitter (SP), a plurality of phase shifters (PS), and an encoder/decoder (E/D). The optical device further comprises output ports (Po). The splitter (SP) splits an input light from the input port into a plurality of lights. The splitter and phase shifters are connected by a plurality of waveguides. The split lights passes on the waveguides. Phase shifters (PS) are inserted along the waveguides. Each of phase shifters shifts light split by the splitter (SP). The light from the phase shifters (PS) are input into a multi-port encoder/decoder (E/D). The E/D generates spectral encoded codes. The spectral encoded codes generated by the multi-port encoder/decoder (E/D) are output by pluralities of output ports (Po). This arrangement is the same as that shown in the above-mentioned FIG. 1. However, the optical device 100 of FIG. 2 is fabricated on a single substrate.

1.1 Code Performance of the Optical Device

Figure 36:
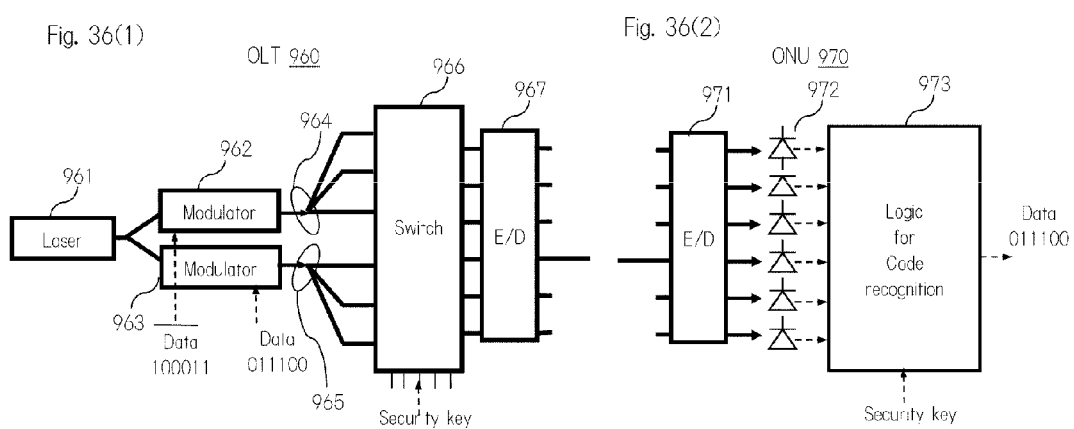
FIGS. 36(1) and 36(2) respectively show arrangements of an OLT and ONU utilizing a multidimensional coding.

The optical device 100 shown in FIG. 2 may have the same multi-code property as the conventional optical device such as the E/D 967 shown in FIG. 36(1). Namely, the optical device 100 is able to generate/process simultaneously a set of N codes, where N is the number of the output ports. The code performance of the present invention has been much improved, because in the case of the optical device 100, autocorrelation signal is delta-like, and it is possible to use time-gating or thresholder at the receiver.

Figure 3:
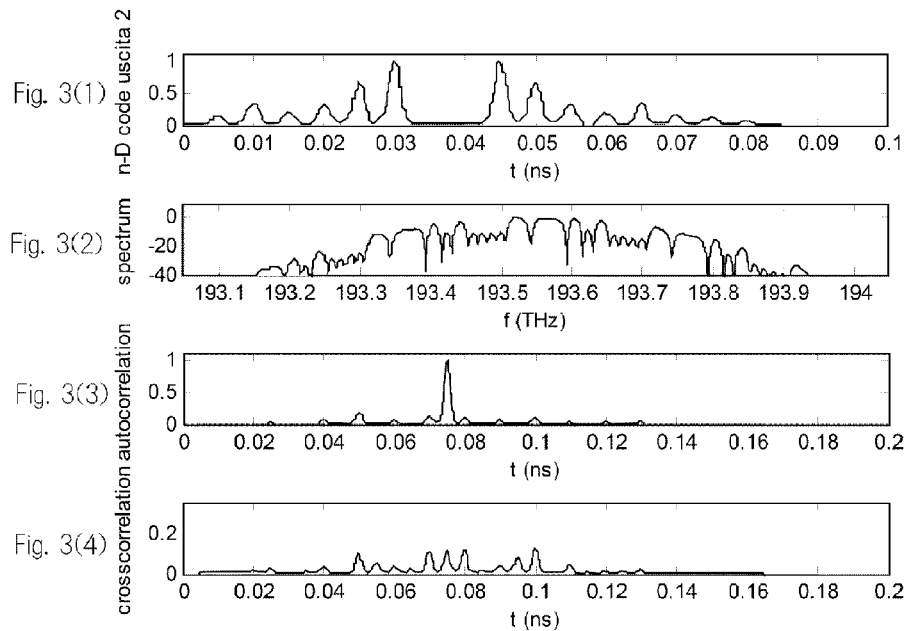
FIGS. 3(1)-3(4) show codes generated by an optical device according to the present invention, the corresponding spectrum, the auto and cross-correlation signals, respectively.

The code generated by the new encoder, the corresponding spectrum, the auto and cross-correlation signals are shown in FIGS. 3(1) to 3(4), respectively. As is shown in FIG. 3(3), the autocorrelation signal of the optical device 100 is delta-like. The power contrast ratio (PCR), i.e. the ratio between the auto- and cross-correlation peak detected at two adjacent ports was 8.8 dB.

Figure 4:
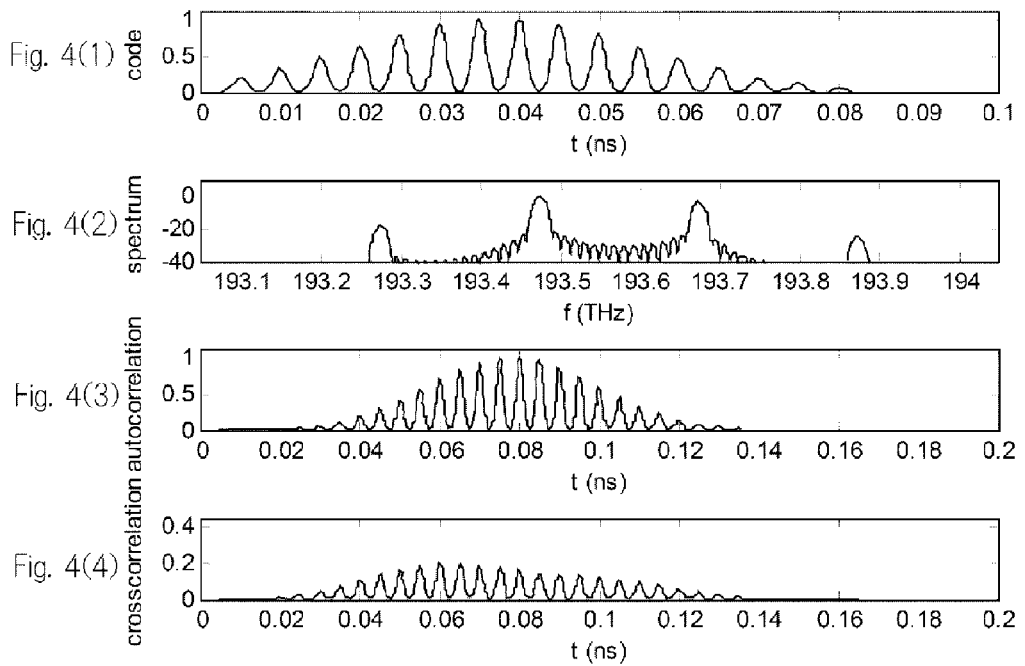
FIGS. 4(1)-4(4) show codes generated by a conventional optical device, the corresponding spectrum, the auto and cross-correlation signals, respectively.

To make a comparison, in FIGS. 4(1) to 4(4) show the code generated by the conventional optical device, the corresponding spectrum, the auto and cross-correlation signals. we observe that the autocorrelation function has a triangular shape, and that the power contrast ratio at two adjacent ports is 7 dB.

1.2 Application of the Optical Device

The optical device 100 can be applied to an MPLS network or a CDMA network.

1.2.1 MPLS Network

FIG. 5(1) shows a schematic diagram of an MPLS network. At an input node 1 of a MPLS network, a label 2 having constant format is inserted at the head (or at the tail) of each data packet 3. In particular, such labels are codes generally having up to 32 bits, each label bit being more properly called chip. At each following node 4, the packet 3 is routed on the basis of the value of the label 2 itself until destination node 5, which finally receives the packet 3.

In other words, MPLS network generates virtual link or tunnel connecting external nodes 1 and 5 of an optical network. If a data packet 3 is entered in the input of a tunnel, the normal IP procedure are suspended and packets are routed towards destination node 5 on the basis of only the value of the labels 2, according to the so-called label switching.

Hence, MPLS protocol does not replace the normal routing of IP packets, but it overlaps this protocol for increasing data transmission speed, allocating a sufficient band for traffic flows with different QoS (Quality of Service) requirements.

When applying the optical device 100 to the MPLS network, the codes generated by the optical device 100 can be used as the labels 2.

1.2.2 CDMA Network

FIG. 5(2) shows a schematic diagram of a CDMA network. The signals transmitted by all the users 50 are distributed to each receiver 51 by means of a star coupler 52. If data coding and decoding are carried out in the optical domain, aggregated transmission speeds very much higher than the ones possible with electronic encoders and decoders are reached. Instead of using N different encoders 53, one for each user 50, a single optical device 100 can be used. At reception, decoding is carried out by using an adapted filter, once that the desired user code is known. The optical device 100 can also be used instead of N different decoders 54, one for each code.

In order to precisely distinguish the different optical codes, it is necessary that the peak of the auto-correlation function is as higher as possible whereas the cross-correlation function must be close to zero everywhere.

2. Encoder/Decoder (E/D)

The E/D used in the optical device 100 can be fabricated according to the above-mentioned Patent Citation 1. This device can simultaneously generate and process N codes directly in the optical domain avoiding all the optical-electrical and vice versa conversions. The same device is capable to both simultaneously generate all the codes and simultaneously process them, and hence it may be used in both input nodes and passage nodes of a MPLS optical network, or in both transmission and reception in a CDMA network.

2.1 Example (1) of Encoder/Decoder

An example (1) of the E/D uses the Wavelet Packets or WP decomposition and Multi-Resolution Analysis or MRA, which employ a pair of Finite Impulse Response, or FIR, conjugate Quadrature Mirror Filters, or QMFs, H(f), and G(f). The coefficients h[n] and g[n] of such filters, having length equal to M, satisfy the following equations:

[Math. 30]

$$g[k] = (-1)^k h[1-k] \quad [8]$$

$$\sum_{k=0}^{M-1} h[k]h[k+2n] = \delta[n] \quad n \in Z$$

$$\sum_{k=0}^{M-1} h[k] = \sqrt{2}$$

$$\sum_{k=0}^{M-1} (-1)^k h[k] = 0$$

where delta[n] is the Kronecker delta function. The wavelet atoms are a sequence of functions, defined in the following recursive manner:

[Math. 31]

$$w_{l+1,2m}(t) = \sum_{k=0}^{M-1} h[k] w_{l,m}(t - 2^l k\tau) \quad [9]$$

$$w_{l+1,2m+1}(t) = \sum_{k=0}^{M-1} g[k] w_{l,m}(t - 2^l k\tau)$$

$$l \geq 0, \; 0 \leq m \leq 2^l - 1$$

where l, equal to a positive integer number, is the decomposition level, and m, also equal to a positive integer number, is the wavelet atom position in the tree, and t is a constant unit delay, that coincides with the interval between the chips of the code sequence, the function $w_{0,0}(t)$ is the scaling function of the MRA, which satisfies the scaling equation

[Math. 32]

$$w_{0,0}(t) = \sqrt{2} \sum_{k=0}^{M-1} h[k] w_{0,0}(2t - k\tau) \quad [10]$$

The WP atoms are self and mutually orthogonal functions at integer multiples of dyadic intervals:

[Math.33]

$$<w_{l,m}(t-2^l n\tau) w_{\lambda,\mu}(t-2^\lambda k\tau)> = \delta[l-\lambda]\delta[m-\mu]\delta[n-k]$$

$$l,\lambda \geq 0, \; 0 \leq m \leq 2^l-1, \; 0 \leq \mu \leq 2^\lambda-1, \; n,k \in Z^+ \quad [11]$$

where the angular brackets '< >' indicate the inner product. As shown in the formula [11] 'n' and 'k' are equal to a positive integer number. Starting from formula [9], a wavelet atom may be expressed as

[Math. 34]

$$w_{l,m}(t) = \sum_{k=0}^{(2^l-1)(M-1)} f_{l,m}[k] w_{0,0}(t - k\tau) \quad [12]$$

where

[Math. 35]

$$f_{l,m}[k] = <w_{l,m}(t) w_{0,0}(t - k\tau)> \quad [13]$$

is the equivalent filter from (l,m) terminal to the root node, which may be recursively computed by using formula [9]. Therefore, the orthogonality condition of formula [11] is:

[Math.36]

$$<f_{l,m}[k-2^l n] f_{\lambda,\mu}[k-2^\lambda i]> = \delta[l-\lambda]\delta[n-i]$$

$$l,\lambda \geq 0, \; 0 \leq m \leq 2^l-1, \; 0 \leq \mu \leq 2^\lambda-1, \; n,i \in Z^+ \quad [14]$$

and the coefficients of the filters $f_{l,m}[k]$ (with

Figure 6:
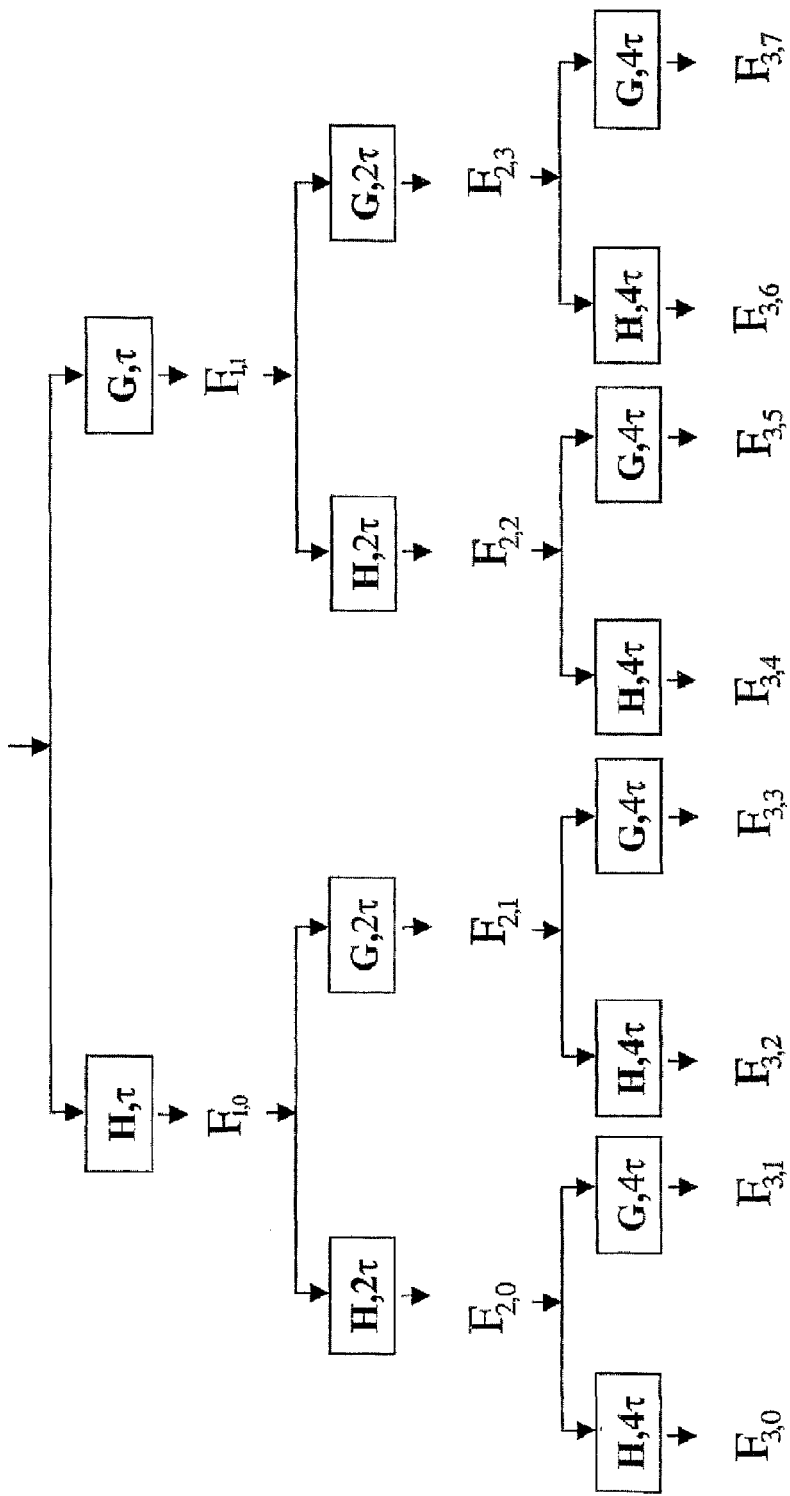
FIG. 6 schematically shows an example (1) of an encoder/decoder used in an optical device according to the invention.

[Math.37]

$$l \geq 0, \; 0 \leq m \leq 2^l-1)$$

are a set of self and mutually orthogonal codes, of length equal to $(2^l-1)(M-1)+1$ The scheme of a full WP decomposition tree is shown in FIG. 6, where each stage is a filter with unit delay increasing in logarithmic progression. A single pulse with duration shorter than t at the input of the optical device of FIG. 2, gives origin to a set of Optical Codes (OCs) at the tree terminals, having length $(2^l-1)(M-1)+1$. All the tree nodes furnish different OCs, even though only the terminals at the same decomposition level (i.e. having same l) generate labels having the same length; moreover, it is possible to add or drop users by simply adding or pruning the tree terminals, without any modification of the existing labels, resulting in a OC set with theoretically infinite code cardinality. In other words, each label is orthogonal to its own time shifted versions, and all the labels generated at any decomposition level are orthogonal with respect to each other.

The device of FIG. 2 may be considered as a set of multiple band filters, wherein the Fourier transforms are:

[Math. 38]

$$F_{l,m}(\omega) = \sum_{k=0}^{(2^l-1)(M-1)} f_{l,m}[k] e^{-j\omega k\tau} \quad l \geq 1, \; 0 \leq m \leq 2^l - 1 \quad [15]$$

and have the following representation:

[Math. 39]

$$F_{l,m}(\omega) = \prod_{k=0}^{l-1} F(2^k \omega) \quad [16]$$

(with F=H or G). In addition, it is:

[Math. 40]

$$F_{1,0}(\omega) = H(\omega) = \sum_{k=0}^{M-1} h[k]e^{-j\omega k\tau} \quad [17]$$

$$F_{1,1}(\omega) = G(\omega) = \sum_{k=0}^{M-1} g[k]e^{-j\omega k\tau}$$

Figure 7:
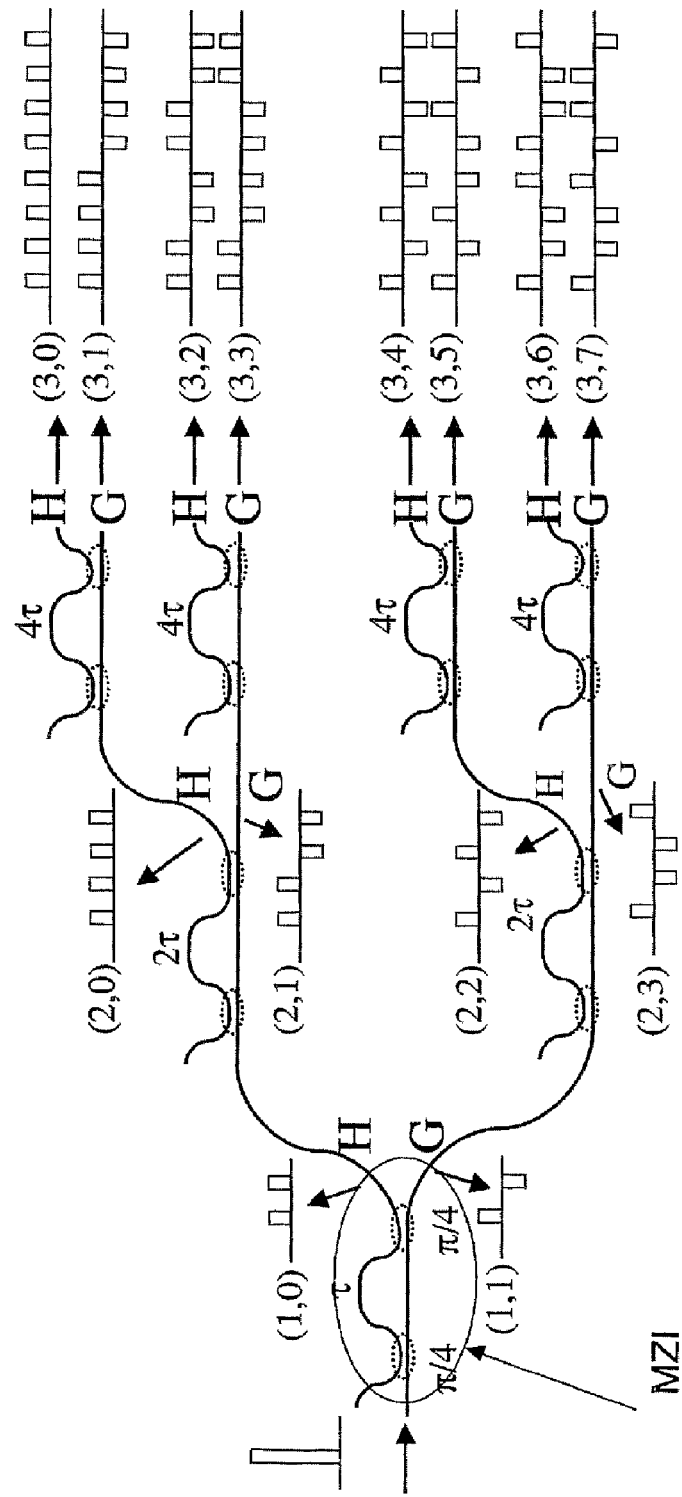
FIG. 7 shows a preferred embodiment of the encoder/decoder according to the scheme of FIG. 6.

A full WP decomposition tree may be implemented in the optical domain by using PLC technology on a single substrate. FIG. 7 shows a preferred embodiment of the device according to the invention related to the Haar wavelet packets with decomposition level l=3. The device is a tree of Mach-Zehnder interferometers or MZIs having input and output 3 dB symmetrical directional couplers and unit delays increasing in logarithmic progression. The QMFs of the Haar wavelet decomposition have length M=2:

[Math.41]

$$h[k]=1/\sqrt{2}[1\ 1]$$

$$g[k]=1/\sqrt{2}[1\ -1]$$

The device schematised in FIG. 7 generates optical codes which coincide with the Hadamard codes, and which are binary Phase Shift Keying or PSK codes of length N, made of N chip pulses with interval t(tau).

With reference to FIG. 8(1), it may be observed that the use of the optical device of FIG. 7 as label generator (in a MPLS network), indicated by reference number 6, provided with one input and N outputs, where N is the number of labels which are generated. A train of light pulses (single chip pulses which then generate the optical codes) is sent to the input of the device 6, the light pulses being obtained by modulating the output of an optical source 7, through a first modulator 11, and the N labels are simultaneously present at each output port. In order to select a label it is needed simply to choose the corresponding output of the device 6 through an electrooptical switcher 8, and hence the optical network may be reconfigured any time when it is necessary in a very simple manner. The selected label 2 is inserted at the front (or at the back) of the data packet 3, which is obtained by modulating the output of the optical source 7 through a second modulator 12, by using a directional coupler 9 and a delay line 10.

The device may be used as encoder in the transmission nodes of a CDMA network, as shown in FIG. 8(2). In this case, the data to be transmitted, which are obtained by modulating the output of the optical source 7 through the modulator 12, are directly sent to the input of the device. At the output, the encoded signal 40 is obtained, which is transmitted into the multiple access network.

The same device shown in FIG. 7 may be used for simultaneously processing all the optical codes at a router node in a MPLS network, or in the receiving systems of CDMA networks.

Figure 9:
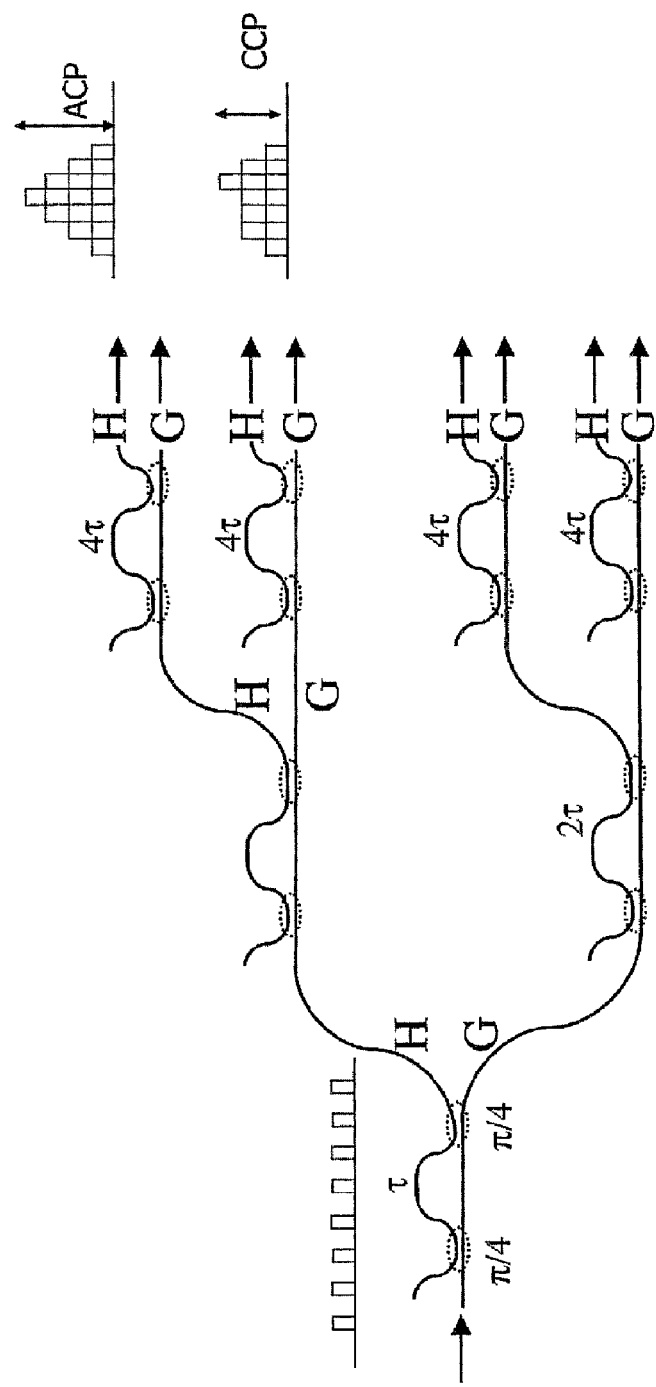
FIG. 9 shows the application of the device of FIG. 7 as optical code processor.

In fact, as shown in FIG. 9, in case of a MPLS network, the device allows all the correlations to be carried out simultaneously. If an IP packet, made of a photonic label attached to the head (or to the tail) of the payload data signal, is sent to the input of the device of FIG. 7, the output signal at the terminal of the corresponding label coincides with the auto-correlation signal presenting an auto-correlation peak ACP, whereas the signals at the other outputs are the cross-correlation functions assuming a lower value. Therefore, the output signals from the device may be used as signals controlling an optical switcher, to the input of which the IP packet to be routed is applied. In the same way, if an encoded signal of a CDMA network is sent to the input of the device, at the output terminal corresponding to the employed code the transmitted signal may be obtained, whereas the signals transmitted with the other codes are detected at the other outputs.

Figure 10:
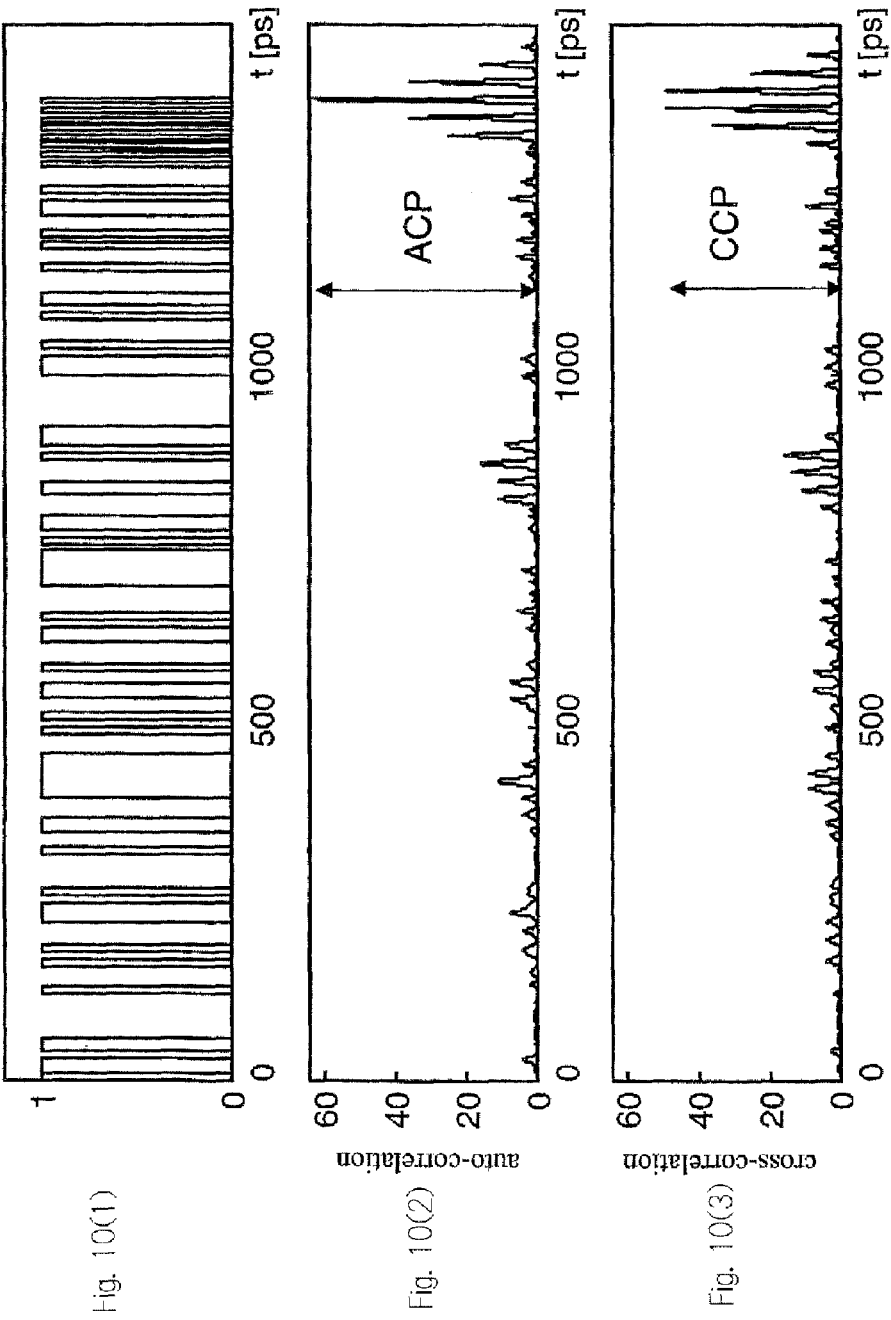
FIGS. 10(1)-10(3) respectively show an optical signal at the input of the device of FIG. 7, and the resulting auto-correlation and maximum cross-correlation signals obtained at the outputs.

In order to correctly discriminate the incoming label it is preferred that the maximum of the cross-correlation signal CCP is much lower than the ACP. Actually, the Hadamard codes generated by the device of FIG. 7 have unequal cross-correlation functions: all the labels have ACP=$N^2$=$8^2$=64, but some of them present a maximum CCP equal to CCP=$(N-1)^2$=$7^2$=49, as shown in particular in FIG. 10, where FIG. 10(1) shows an optical signal comprising a data packet at 100 Gbit/sec and a front label having chip pulse duration equal to 5 ps and an interval t equal to 12.5 ps, whereas FIGS. 10(2) and 10(3) show the auto- and cross-correlation signal respectively.

The parameter describing the correlation performances is the ratio r between the maximum CCP and the ACP, and in this case it is equal to r=0.77. Therefore, the set of codes presents unsatisfactory performances. An optimal set of codes is made of optical codes presenting the same auto- and cross-correlation functions. To this end, recalling formulas [16] and [17], it is necessary that all the filters $F_{l,m}$ have the same length (i.e. the same decomposition level l) and are shifted copies of a prototype filter $F_{l,0}$ according to the following formula

[Math. 42]

$$|F_{l,m}(\omega)| = \left|F_{l,0}\left(\omega + \frac{2\pi m}{2^l \tau}\right)\right| \quad [18]$$

Since H and G are a pair of QMF filters satisfying the relation

[Math. 43]

$$G(\omega) = e^{-j\omega\tau}H^*\left(\omega + \frac{\pi}{\tau}\right) \quad [19]$$

where asterisk indicates the complex conjugation, the condition [18] is automatically satisfied for l=1. For l>1 it is possible to reverse the decomposition scheme of FIG. 7, by letting the delay decrease from the root to the terminals of the tree, and to add constant phase shifter in order to satisfy condition [18].

2.2 Example of Encoder/Decoder

Figure 11:
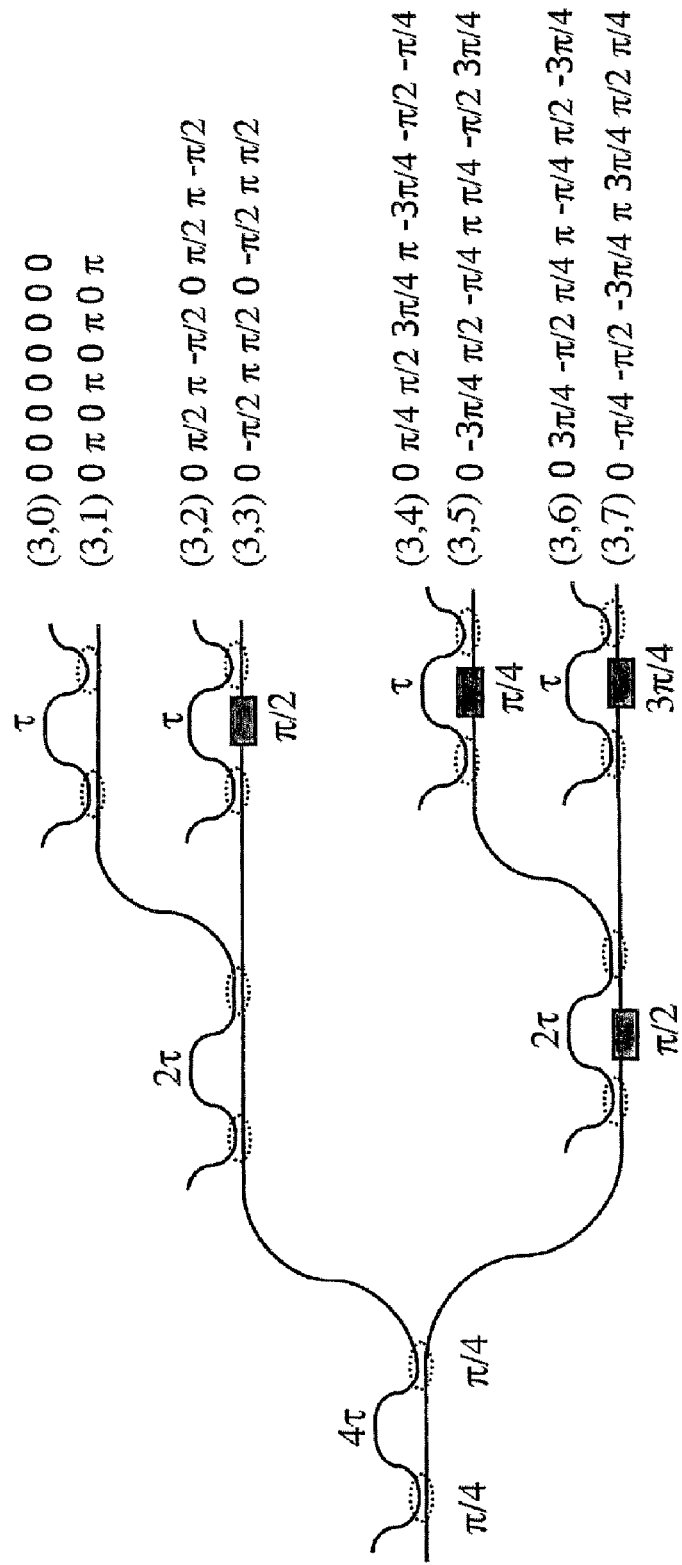
FIG. 11 shows an example (2) of an encoder/decoder used in an optical device according to the invention.
Figure 12:
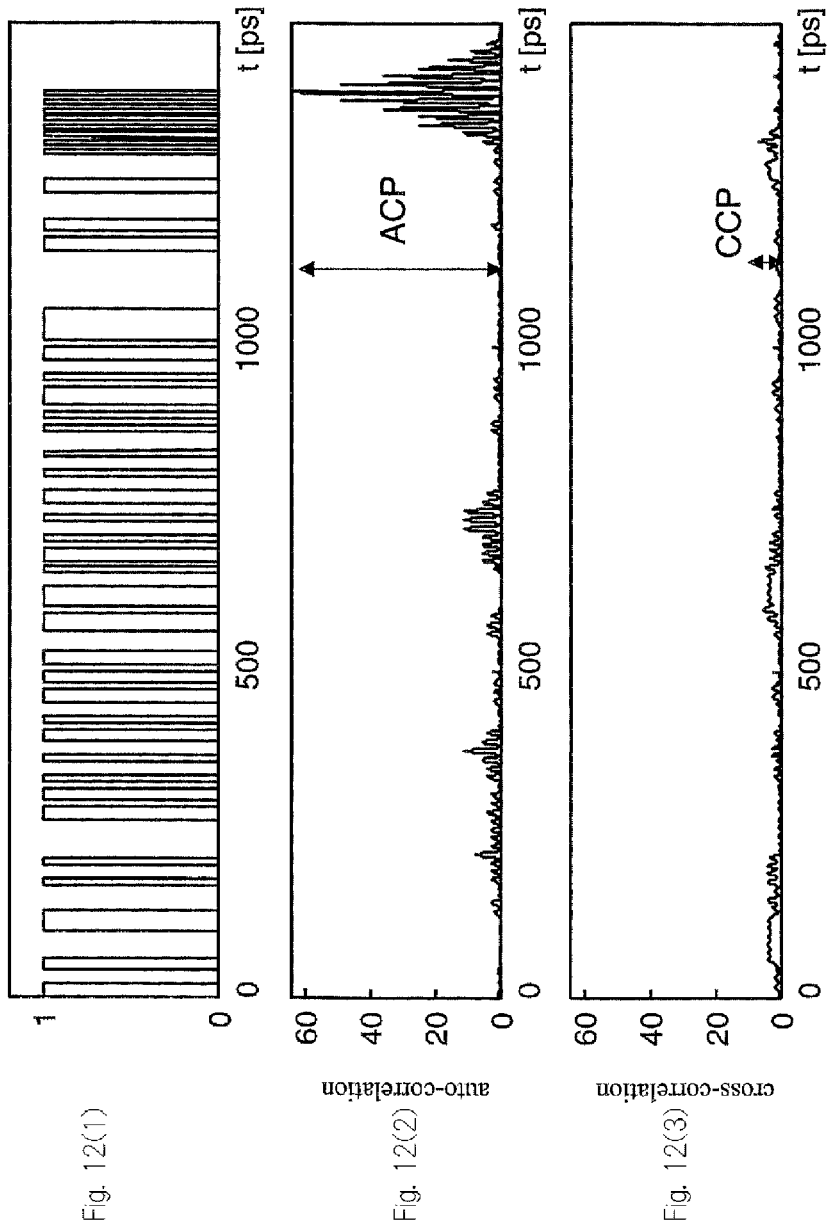
FIGS. 12(1)-12(3) respectively show an optical signal at the input of the device of FIG. 11, and the resulting auto-correlation and maximum cross-correlation signals obtained at the outputs.

A second example of the E/D apt to generate an optimal code set is shown in FIG. 11. It generates eight phase PSK labels, all having ACP=64, maximum CCP=6.83, and r=0.107, as shown in FIG. 12, where FIG. 12(1) shows an optical signal comprising a data packet at 100 Gbit/sec and a front optical code having chip pulse duration equal to 5 ps and an interval t equal to 12.5 ps, whereas FIGS. 12(2) and 12(3) show the auto- and cross-correlation signals, respectively. In particular, in order to implement a similar optimal encoder/decoder with N outputs, N−1 MZIs, Mach-Zehnder interferometers, and some phase shifters are needed.

2.3 Example of Encoder/Decoder

Figure 13:
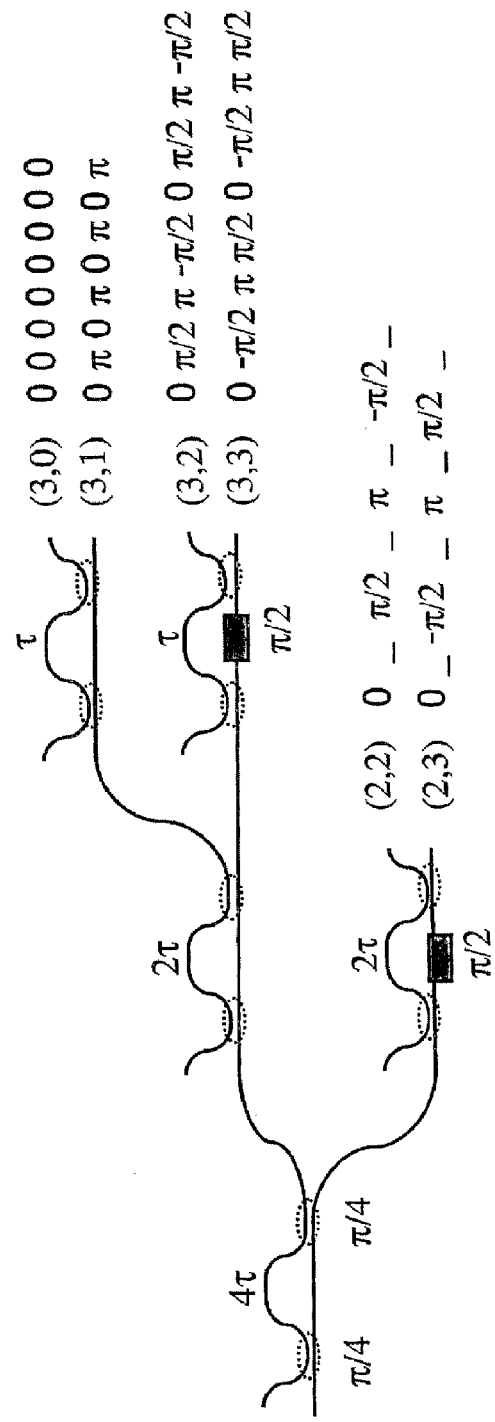
FIG. 13 shows an example (3) of an encoder/decoder used in an optical device according to the invention.

Also in this case, it is possible to prune the tree if the number of the active users is lower than N. Moreover, all the generated codes have the same length. For instance, FIG. 13 shows a third example of the E/D obtained from the one of FIG. 11 by pruning the last two pairs of QMF filters. The device of FIG. 13 generates N=6 labels having the same length equal to 8. The labels generated at terminals (3,0) (3,1) (3,2) and (3,3) have ACP=64, whereas the labels generated at terminals (2,2) and (2,3) have ACP=16; all the labels have maximum CCP=2.

FIG. 14(1) schematically shows a portion of the MPLS network of FIG. 5(1) wherein the device 6 of FIG. 8(1) is employed in both an input node 1 and a router node 4, where it controls an optical switcher 13.

Instead, FIG. 14(2) shows the CDMA network of FIG. 5(2) wherein a sole device 6, as the one of FIG. 11, is employed for a plurality of transmission nodes 4, for encoding data of the N users with different codes, and a similar sole device 6' is employed for a plurality of receiving nodes 5, for decoding the N received signals.

2.4 Example of Encoder/Decoder

Figure 15:
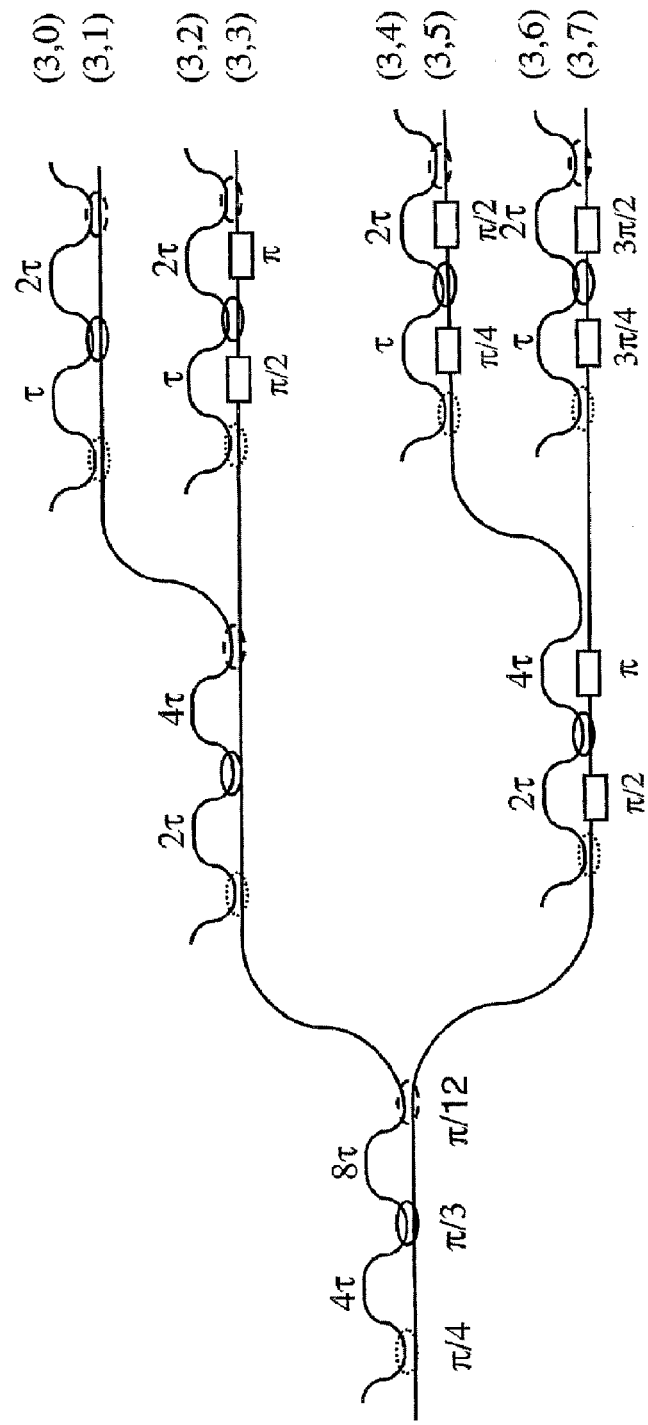
FIG. 15 shows an example (4) of an encoder/decoder used in an optical device according to the invention.

Code orthogonality performances may be further enhanced by increasing N. However, it is possible to generate code sequences with very good correlation properties without modifying the number of users N, by increasing the length M of each QMF filter. By way of example and not by way of limitation, a fourth example of the E/D, implementing a full tree of Daubechies wavelet filters having length M=4, is shown in FIG. 15. The device generates N=8 optical codes of length equal to 22, and the photonic labels are made of chip pulses with unequal amplitudes and phases. Each code has ACP=13.5, maximum CCP=1.55, and r=0.114.

2.5 Example of Encoder/Decoder

Figure 16:
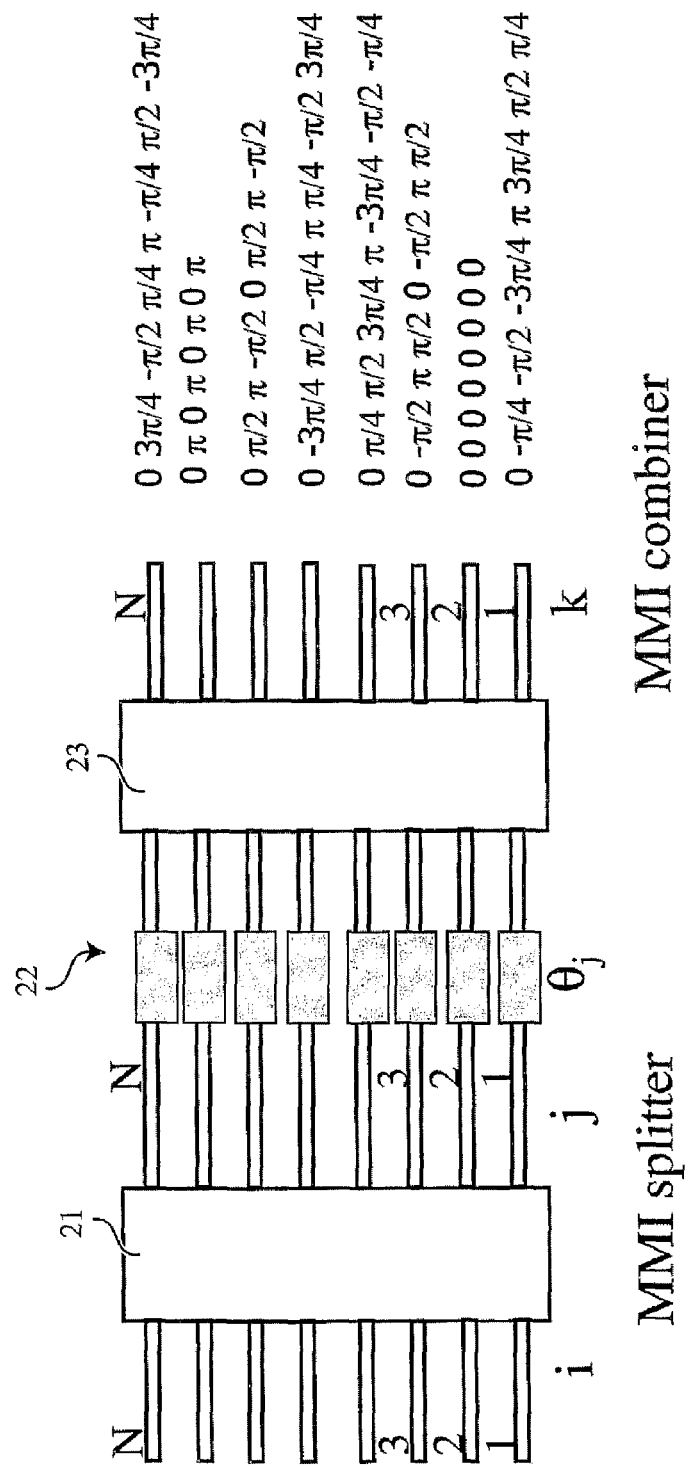
FIG. 16 schematically shows an example (5) of an encoder/decoder used in an optical device according to the invention.

A fifth example of the E/D apt to generate the same optical codes of the device of FIG. 11, is shown in FIG. 16. It comprises two Multi Mode Interference or MMI couplers 21 and 23, a grating 22 of N waveguides and N optical phase shifters. In particular, the device of FIG. 16 has N inputs and N outputs. In the following the input ports i, the output ports k and the grating arms j are all referred to by numbers from 1 to N upwardly.

The first Multi Mode Interference, MMI, coupler 21 is an N×N uniform power splitter, i.e. it is a waveguide supporting a large number of modes on the transverse direction and it is unimodal along the vertical axis, which is connected to N incoming single-mode waveguides and to N outgoing single-mode waveguides. Due to the self-imaging property of multimode waveguides, a field distribution at any one of the inputs is reproduced at the output plane in N images, that have equal amplitudes and different phases.

In order to generate N images, it is preferred that the MMI coupler 21 has a length $L_c = M3L_\pi/N$, where M and N are any two positive integer numbers without a common divisor larger than 1 and

Figure 17:
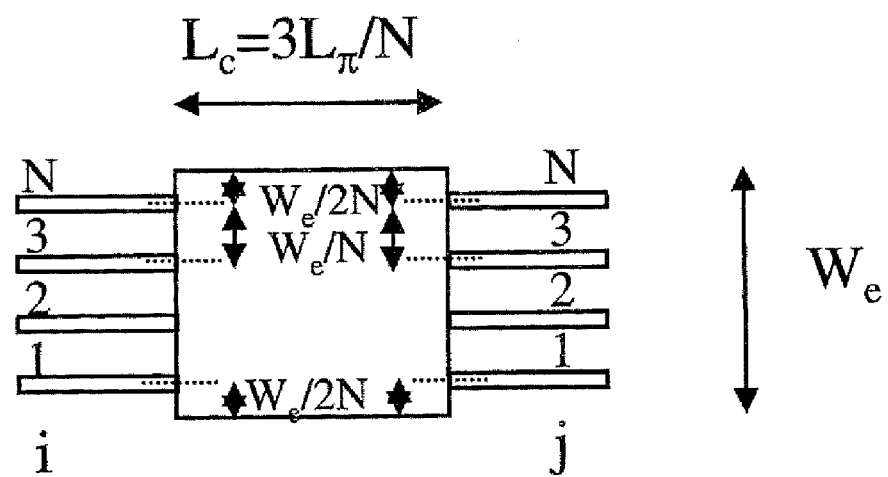
FIG. 17 schematically shows an N×N MMI coupler of the device of FIG. 16.

[Math. 44]

$$L_\pi = \frac{\pi}{\beta_0 - \beta_1} = \frac{4n_g W_e^2}{3\lambda} \quad [20]$$

where B(beta)$_0$ and B(beta)$_1$ are the propagation constants of the zeroth and first order modes, respectively, $n_g$ is the (effective) refractive index, and lambda is the free space wavelength. $W_e$ is the effective width of the fundamental transverse mode, which is slightly larger than the actual guide (or slab) width W, so as to take the lateral penetration depth of each single mode field into account; for high-contrast waveguides, it may be assumed that $W_e$ is almost equal to W. In most practical applications, integrated optical devices should be as short as possible, and for the MMI coupler 21 it may be assumed that M=1. FIG. 17 schematically shows an N×N MMI coupler as the ones of FIG. 12. The incoming and outgoing waveguides are placed at equally spaced positions:

[Math. 45]

$$x_i = (2i-1)\frac{W_e}{2N} \quad i = 1, 2, \ldots N \quad [21]$$

$$x_j = (2j-1)\frac{W_e}{2N} \quad j = 1, 2, \ldots N$$

The phases phai$_{ij}$ associated with imaging from input i to output j are:

[Math. 46]

$$\varphi_{ij} = \phi_1 - \frac{\pi}{2}(-1)^{i+j+N} + \frac{\pi}{4N}\left[i + j - i^2 - j^2 + (-1)^{i+j+N}\left(2ij - i - j + \frac{1}{2}\right)\right] \quad [22]$$

for $i, j = 1, 2, \ldots N$

With

[Math. 47]

$$\phi_1 = -\beta_0\frac{3L_\pi}{N} - \frac{9\pi}{8N} + \frac{3\pi}{4} \quad [23]$$

Formula [22] shows that phai$_{ij}$=phai$_{ji}$, thanks to the symmetry of the device, since input ports and output ports may be used interchangeably. Hence, the impulse response $h_{ik}(t)$ from the input i to the output k coincides with the impulse response $h_{i'k'}(t)$ from the input i' to the output k' when i'=k and k'=i.

An optical pulse at any input of the ports of the MMI coupler 21 is reproduced at all the outputs of the coupler and distributed to the waveguides of the grating 22, which have different lengths. Hence, the pulses travel different paths in the arms of the grating 22 and delayed copies of the pulse are then combined together by the following MMI coupler 23. Therefore, the impulse response of the device from the input i to the output k is equal (except for a constant phase factor and possibly also for a constant amplitude factor) to

[Math. 48]

$$h_{ik}(t) = \sum_{j=1}^{N} e^{j(\varphi_{ij} + \varphi_{jk} + \theta_j)}\delta\left(t - \frac{n_e L_j}{c}\right) \quad i, k = 1, 2, \ldots N \quad [24]$$

where $j=(-1)^{1/2}$, d(delta) is the Dirac delta function, (theta)$_j$ is a constant phase shift introduced by the j-th phase shifter. Moreover, $L_j$ is the length of the j-th arm of the grating 22 and $n_e$ is the corresponding (effective) refractive index.

In order to generate optical codes made of equally spaced chips, it is preferred that the lengths $L_j$ (j=1, 2 ... N) of the arms of the grating 22 satisfy the condition

[Math.49]

$$L_j = L_m + d_j \Delta L\ j=1, 2, \ldots N \qquad [25]$$

with the integer numbers

[Math.50]

$$d_j \in [0,1,2,\ldots N-1]$$

satisfying the condition

[Math.51]

$$d_j \neq d_{j'}\ \text{if}\ j \neq j'.$$

$L_m$ is the length of a reference waveguide of the grating 22, which is assumed to be the shortest ($d_m = 0$), and D(DELTA)L is the minimum difference between the lengths of two waveguides of the grating 22. Although in the most general configuration the lengths of the grating do not linearly increase with j, it is necessary that the factors dj of the arms of the grating 22 are all different and completely cover the interval [0 to N–1]. The impulse response from the input i to the reference output m is equal to

[Math. 52]

$$h_{im}(t) = \sum_{j=1}^{N} e^{j(\varphi_{ij}+\varphi_{jm}+\theta_j)} \delta\left(t - \frac{n_e L_j}{c}\right)\ i=1, 2, \ldots N \qquad [26]$$

and the optical code at the output m is a sequence of N PSK chips with equal amplitudes and different phases. The values (theta)$_j$ of the phase shifters have to be chosen so that the reference code is made of chips all having equal phases, i.e.

[Math.53]

$$\varphi_{ij} + \varphi_{jm} + \theta_j = 2\pi A_{ijm}\ i,j = 1,2,\ldots N \qquad [27]$$

where $A_{ijm}$ are integer constants.

For any fixed input i and reference output m, it is possible to compute the values of the phase shifts (theta), starting from formula [27].

If the optical codes at the outputs k and k' are orthogonal, the cross-correlation function of the corresponding impulse responses is about zero:

[Math.54]

$$h_{ik}(t) \otimes h_{ik'}(t) \cong 0\ i,k,k'=1,2,\ldots N\ \text{and}\ k \neq k' \qquad [28]$$

The transfer function $H_{ik}(f)$ from the input i to the output k may be computed by carrying out the Fourier transform of the impulse response [24]:

[Math. 55]

$$H_{ik}(f) = \sum_{j=1}^{N} e^{j(\varphi_{ij}+\varphi_{jk}+\theta_j)} e^{-j\frac{2\pi f n_e L_j}{c}}\ i,k=1,2,\ldots N \qquad [29]$$

In the frequency domain relation [28] becomes

[Math.56]

$$H_{ik}^*(f) H_{ik'}(f) \cong 0\ i,k,k'=1,2,\ldots N\ \text{and}\ k \neq k' \qquad [30]$$

This condition is always satisfied if the transfer functions are translated copies of the reference transfer function $H_{im}(f)$, i.e. they are equal to:

[Math. 57]

$$H_{ik}(f) = H_{im}\left(f - n\frac{c}{n_e N \Delta L}\right)\ k=1, 2, \ldots N \qquad [31]$$

where n is an integer number which satisfies the condition that the values corresponding to two different outputs are different:

[Math.58]

$$k \neq k' \rightarrow n \neq n'\ k,k'=1,2,\ldots N \qquad [32]$$

An optical code set, wherein all the optical codes have identical auto- and cross-correlation functions, may be generated by translating the Fourier transform of a reference code in the frequency domain. By making use of formula [27], the transfer function between the input i and the reference output m is equal to

[Math. 59]

$$H_{im}(f) = \sum_{j=1}^{N} e^{-j\frac{2\pi f n_e L_j}{c}}\ i=1, 2, \ldots N \qquad [33]$$

and by substituting it in formula [31] it is obtain as result

[Math. 60]

$$H_{ik}(f) = \sum_{j=1}^{N} e^{-j\frac{2\pi f n_e L_j}{c}} e^{j\frac{2\pi n L_j}{N \Delta L}}\ i,k=1, 2, \ldots N \qquad [34]$$

From the comparison of formulas [29] and [34], it may be seen that the OC are orthogonal if the following conditions is satisfied:

[Math. 61]

$$\varphi_{ij} + \varphi_{jk} + \theta_j = \frac{2\pi n L_j}{N \Delta L} + 2\pi A_{jmk}\ i,j,k=1,2,\ldots N \qquad [35]$$

By using formulas [25] and [27], it is

[Math. 62]

$$\varphi_{jk} - \varphi_{jm} = \frac{2\pi n L_m}{N \Delta L} + \frac{2\pi n d_j}{N} + 2\pi A_{jmk}\ j,k=1,2,\ldots N \qquad [36]$$

and by putting j=m, it is obtained

[Math. 63]

$$\varphi_{mk} - \varphi_{mm} = \frac{2\pi n L_m}{N \Delta L} \quad k = 1, 2, \ldots N \qquad [37]$$

which, substituted in formula [36], gives

[Math. 64]

$$\Delta \varphi_{jk} \equiv \varphi_{jk} - \varphi_{jm} - \varphi_{mk} + \varphi_{mm} = \frac{2\pi n d_j}{N} + 2\pi A_{jmk} \qquad [38]$$
$$j, k = 1, 2, \ldots N$$

In particular, it is D(delta)$_{phai\,jm}$=0.

The phase difference may be computed from formula [22], obtaining

[Math. 65]

$$\Delta \varphi_{jk} = \frac{2\pi(-1)^N}{N} A_j A_k - \frac{\pi(-1)^N}{2} A_{jk} \quad j, k = 1, 2, \ldots N$$

with

[Math. 66]

$$A_q = \frac{1}{2}\left[(-1)^{q+m}\left(q - \frac{1}{2}\right) - \left(m - \frac{1}{2}\right)\right] \quad \text{per } q = k, j \qquad [39]$$
$$A_{jk} = [1 - (-1)^{j+m} - (-1)^{k+m} + (-1)^{j+k}]$$

where $A_q$ is an integer, whereas $A_{jk}$ is an integer multiple of 4. Therefore condition [38] may be expressed as:

[Math. 67]

$$n = (-1)^N A_k = \left\{\frac{(-1)^N}{2}\left[(-1)^{k+m}\left(k - \frac{1}{2}\right) - \left(m - \frac{1}{2}\right)\right]\right\} \qquad [40]$$
$$k = 1, 2, \ldots N$$
$$d_j = A_j = \left\{\frac{1}{2}\left[(-1)^{j+m}\left(j - \frac{1}{2}\right) - \left(m - \frac{1}{2}\right)\right]\right\} \bmod N \quad j = 1, 2, \ldots N$$
$$A_{jmk} = -\frac{(-1)^N}{4} A_{jk} = -\frac{(-1)^N}{4}[1 - (-1)^{j+m} - (-1)^{k+m} + (-1)^{j+k}]$$
$$k, j = 1, 2, \ldots N$$

where 'mod' indicates the module arithmetic operator, so that

[Math.68]

$$d_j \in [0, 1, 2, \ldots N-1].$$

Formulas [40] give the rules for implementing the fifth embodiment of the device shown in FIG. 17. In particular, the first formula [40] gives the relative phase shift between the optical code at the reference output m and the optical code at the output k; the second formula [40] gives the factors $d_j$ and thus the lengths of the arms $L_j$ of the waveguide grating 25. The transfer function from the input i to the output k is:

[Math. 69]

$$H_{ik}(f) = \sum_{j=1}^{N} e^{-j\frac{2\pi f n_e L_j}{c}} e^{j\frac{2\pi n L_j}{N\Delta L}} = \sum_{j=1}^{N} e^{-j\frac{2\pi f n_e L_j}{c}} e^{j\frac{2\pi n L_m}{N\Delta L}} e^{j\frac{2\pi n d_j}{N}} \qquad [41]$$
$$i, k = 1, 2, \ldots N$$

For sake of simplicity, it is possible to choose the reference length $L_m$=ND(DELTA)L, so that the transfer function [41] becomes

[Math. 70]

$$H_{ik}(f) = \sum_{j=1}^{N} e^{-j\frac{2\pi f n_e L_j}{c}} e^{j\frac{2\pi n d_j}{N}} \quad i, k = 1, 2, \ldots N \qquad [42]$$

and the phases of the OCs at the output k are multiple of 2 pai/N. In this case, from formula [37] it is

[Math.71]

$$\phi_{mk} = \phi_{mm} \quad k=1, 2, \ldots N \qquad [43]$$

and the OCs generated by the device of FIG. 17 coincide with the ones generated by the device of FIG. 16.

By way of example and not by way of limitation, in the case where the device of FIG. 17 has N=8 inputs and N=8 outputs, assuming that the reference output is m=2 and that the input port is i=4, from formulas [40] it results that the factors of the arms of the grating 22 are $d_j$=(7 0 6 1 5 2 4 3), whereas the values of the phase shifters according to formula [20] are:

[Math.72]

$$\theta_j = -2\phi_f - (13\pi/32 \ 29\pi/32 \ -19\pi/32 \ 29\pi/32 \ -3\ \pi/32 \ -13\pi/32 \ -3\pi/32 \ -19\pi/32).$$

Figure 18:
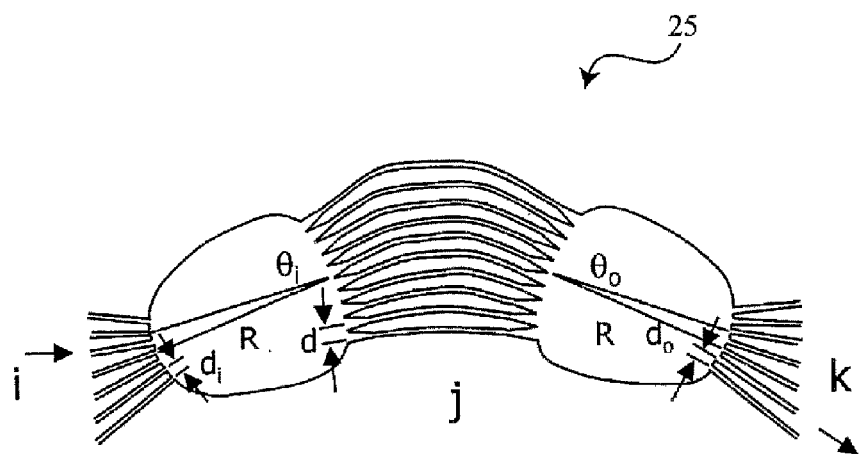
FIG. 18 schematically shows an example (6) of an encoder/decoder used in an optical device according to the invention.

The reference code at the output m=2 has all the phases equal to zero, whereas the codes generated at the other outputs are the ones reported in FIG. 16, identical to the ones generated by the device of FIG. 18.

According to formula [27], the factors of the arms of the grating 22 do not increase with j monotonically, and, in order to avoid crossing of the planar guides, it is necessary either to insert multiple U bends into the layout or to use an S configuration. Alternatively, it is possible to establish the condition that $d_j$=a(alpha)j, with a(alpha) integer. In this case, the factors of the grating 22 are equal to:

[Math. 73]

$$\frac{2\alpha j - \frac{1}{2}}{j - \frac{1}{2}} = (-1)^{j+m} \quad j = 1, 2, \ldots N \qquad [44]$$

which is always satisfied for j even and a(alpha)=2. Therefore, if only even inputs are considered, even outputs and arms of the waveguide grating 22 with even index, the device of FIG. 16 may be implemented with the lengths of the arms of the grating 22 monotonically increasing with j.

It is immediate for those skills in the art to adapt the device of FIG. 16 to the case where the first MMI coupler is a 1×N non uniform splitter with a sole input and N outputs. Other embodiments of the device according to the invention may comprise a tree structure in the nodes of which devices similar to the ones of FIG. 16 are present; in such case, it is possible to generate a code set with a very high cardinality.

2.6 Example of Encoder/Decoder

FIG. 18 shows a sixth example of the E/D a waveguide grating and two focusing couplers or 'slabs'. In particular, the device 25 of FIG. 18 comprises N input waveguides, N output waveguides, two coupling waveguides and a waveguide grating. The waveguides at the input and output of each coupler are located according to the Rowland circle construction, whereas the length of two adjacent waveguides in the grating varies by a constant D(DELTA)L.

The transfer function between the input i and the output k is equal (except for a constant phase factor and possibly also for a constant amplitude factor) to:

[Math. 74]

$$H_{ik}(f) = \sum_{j=1}^{N} e^{-j\frac{2\pi f j n_e \Delta L}{c}} e^{-j\frac{2\pi f n_s d j}{c}(\sin\theta_i + \sin\theta_0)} \quad [45]$$
$$i, k = 1, 2, \ldots N$$

where $n_s$ and $n_c$ are, respectively, the effective refractive indexes of the slabs and of the grating waveguides; d is the pitch of the waveguide grating, and (theta)$_i$ and (theta)$_o$ are the angles subtended by the input and output waveguides, respectively, i.e.

[Math. 75]

$$\sin\theta_i \cong t\frac{d_i}{R} \quad \sin\theta_o \cong k\frac{d_o}{R} \quad [46]$$

The pitches of the input and output waveguide gratings are indicated with $d_i$ and $d_o$, respectively, whereas R is the slab focal length. Assuming that $d_i=d_o$, and choosing the layout parameters so that

[Math. 76]

$$N = \frac{\lambda R}{n_s d d_o} \quad [47]$$

from formulas [45] and [46] it is obtained

[Math. 77]

$$H_{ik}(f) = \sum_{j=1}^{N} e^{-j\frac{2\pi f j n_e \Delta L}{c}} e^{-j\frac{2\pi j}{N}(i+k)} \quad i, k = 1, 2, \ldots N \quad [48]$$

For each input i, a reference output waveguide may be defined which is given by m=N−i if 'i' is not N and m=N if 'i'=N. The reference transfer function is equal to

[Math. 78]

$$H_{im}(f) = \sum_{j=1}^{N} e^{-j\frac{2\pi f j n_e \Delta L}{c}} \quad i = 1, 2, \ldots N \quad [49]$$

and the related impulse response is equal to

[Math. 79]

$$h_{im}(t) = \sum_{j=1}^{N} \delta(t - j\tau) \quad i = 1, 2, \ldots N \quad [50]$$

where $t(tau)=D(DELTA)Ln_e/c$ is the chip period of the optical codes.

Figure 21:
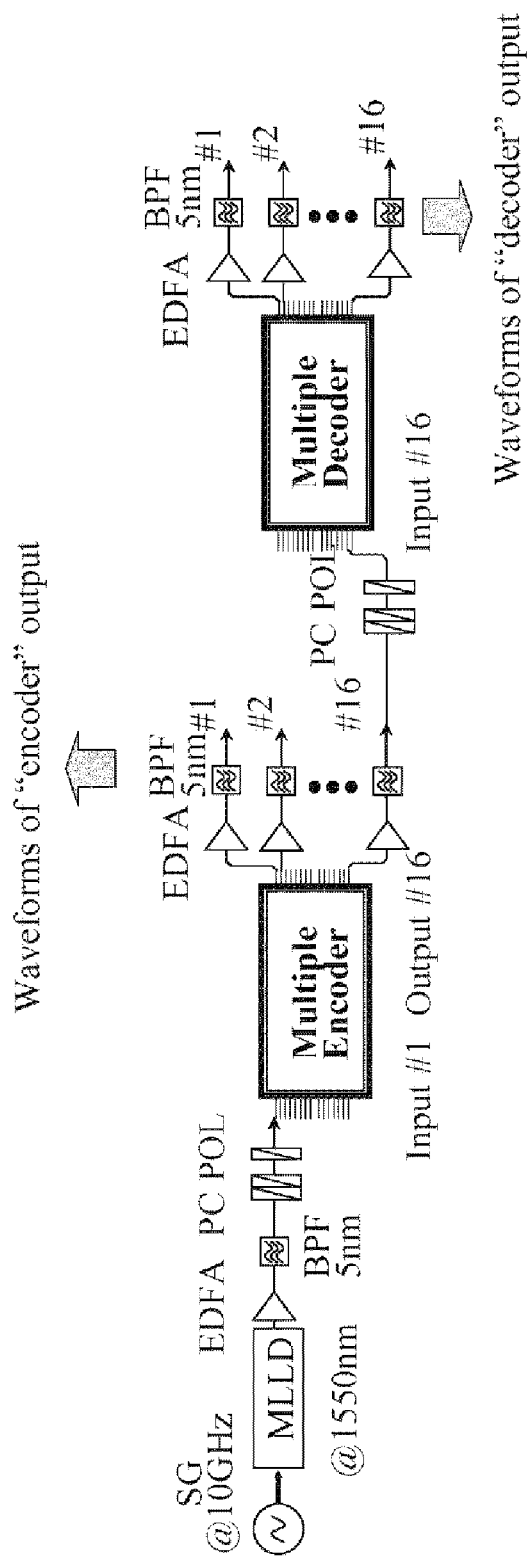
FIG. 21 shows an experimental setup for characterizing an encoder/decoder used in an optical device according to the invention.

In such a way, the device 25 of FIG. 21 generates the same codes generated by the devices of FIGS. 14 and 19. In fact, the transfer function from the input i to the output k is a translated version of the reference function

[Math. 80]

$$H_{ik}(f) = H_{im}\left(f - \frac{i+k}{N\tau}\right) \quad i, k = 1, 2, \ldots N \quad [51]$$

Further embodiments of the device according to the invention allow the code cardinality to be increased without increasing the code length, by encoding the labels on different wavelengths, by using a variable wavelength or tunable laser source as source of the single input chip.

As a further example, by considering two identical pulses at the same wavelength sent into the inputs $i_1$ and $i_2$ of the device of FIG. 21, the transfer function at the output k is equal to:

[Math. 81]

$$H_k(f) = H_{i_1 k}(f) + H_{i_2 k}(f) \quad [52]$$
$$= \sum_{j=1}^{N} e^{-j2\pi j f\tau} e^{-j\frac{2\pi j}{N}(i_1+k)} + \sum_{j=1}^{N} e^{-j2\pi j f\tau} e^{-j\frac{2\pi j}{N}(i_2+k)}$$
$$= H_{i_1 m_1}\left(f - \frac{i_1+k}{N\tau}\right) + H_{i_1,m_1}\left(f - \frac{i_2+k}{N\tau}\right)$$
$$k = 1, 2, \ldots N$$

where m1 is the reference output corresponding to $i_1$, that is $m_1=N-i_1$ if $i_1$ is not N and $m_1=N$ if $i_1=N$. The corresponding impulse response is equal to:

[Math. 82]

$$h_k(t) = \sum_{j=1}^{N}\left(e^{-j\frac{2\pi j}{N}(i_1+k)} + e^{-j\frac{2\pi j}{N}(i_2+k)}\right)\delta(t - j\tau) = \quad [53]$$
$$2\sum_{j=i}^{N} e^{-j\frac{2\pi j}{N}\left[k+\frac{(i_1+i_2)}{2}\right]}\cos\left[\frac{\pi j(i_1-i_2)}{N}\right]\delta(t - j\tau)$$

so that the OCs generally have unequal amplitudes and phases. In particular, if $i_1-i_2=N/2$, OCs of length N are generated which are made only of even chip pulses with the same amplitudes.

When the device is used as label processor in a router node, if a label is sent to the input port i=k, two auto-correlation signals are at the outputs k=$i_1$ and k'=$i_2$, due to the device reciprocity. Therefore, for a multi-dimensional OC set the exact match between two codes is detected by measuring the simultaneous presence of two or more auto-correlation peaks. For a two-dimensional code set with N=8, it is ACP=16, and maximum CCP=3, so that r=0.187, slightly worst than the case of one-dimensional OCs.

The advantages given by the optical device and by the optical code set according to the present invention are evident, for instance in applications related to MPLS networks and to CDMA networks.

In particular, the same device may be used as both encoder and decoder: by suitably selecting the device output a different optical code is selected.

With regard to the use of optical codes according to the present invention in multiple access networks, the same considerations concerning MPLS networks apply. In particular, the signals of the N users are received with multiple access interference or MAI substantially null, since the proposed optical codes are highly orthogonal.

The preferred embodiments have been above described and some modifications of this invention have been suggested, but it should be understood that those skilled in the art can make other variations and changes, without so departing from the related scope of protection, as defined by the following claims.

2.6 Application of E/D in a Code-Based Photonic Router

In a code-based photonic router, the label-switch-routing (LSR) node controller determines a new label from the lookup table, given the incoming label and the fiber port, whereas the forwarding function involves swapping the original label with a new one (see FIG. 19). At the node input, the label processing is performed by the E/D, which performs the optical correlations between the incoming code and all the code entries in the lookup table in parallel, simultaneously. The ACP emerges only at one output, whereas the cross-correlation signals are detected at the other outputs. The electrical signals from the detectors drive the optical packet switch, and the incoming packet is forwarded to the desired output. The photonic label swapping is performed by removing the incoming label and inserting a new one, according to the LDP. A short laser pulse is driven to the E/D input and N labels are simultaneously generated at the device outputs, so that a given label is added to the incoming packet, by coupling the corresponding device output ports to the fiber. The label switch of FIG. 19 allows a dynamical label swapping, since the label can be easily changed by selecting a different E/D output port; in previous code-based photonic router architectures, to change the label, it was necessary to replace the encoder with another device.

2.7 Multi-Port E/D in an Arrayed Waveguide Grating (AWG) Configuration

FIG. 20 shows an example of a multiple E/D in an arrayed waveguide grating (AWG) configuration, with 16 input/output ports, that is able to process/generate 16 OCs in parallel. Although this device has an AWG configuration, it is not a wavelength de-multiplexer, but it behaves like a transversal filter (TVF) to simultaneously generate and process 16-chip optical phase-shift keying (PSK) codes [20].

To generate a full set of OCs, a short laser pulse is transmitted into one of the device input port, and at the device output we obtain N=16 different OCs, as illustrated in FIG. 20(1). To process a label, the incoming OC is forwarded to the same input port and at the device outputs all the correlation signals are detected by an array of photodetectors; the autocorrelation peak (ACP) revealed at the matched port unequivocally identifies the code [see FIG. 3(2)].

Each code is composed of 16 pulses (which are often termed chips in the literature) with a different phase (that is a PSK code); the time interval between two consecutive chips is D(DELTA)t(tau)=5 ps, so that the code chip rate is 1/D (DELTA)t(tau)=200 gigachip/s. This parameter determines the packet processing speed that is related to the time needed for the OC to transit through the decoder and to detect the ACP at the device output: the label processing speed is 1/(N−1)D(DELTA)t(tau)=13.3×$10^9$ packet/s, which for a packet length of 1.0 kb translates into a transmission capacity of 13.5 Tb/s. The chips in the OC are copies of the input laser pulse: To avoid their overlapping, it is necessary that the input laser pulse is shorter than the chip interval D(DELTA)t(tau), but the smaller the optical source pulse width d(delta)t, the larger spectral bandwidth of the codes, and an optimization of the packet processing speed and the bandwidth occupation is necessary. The number of labels N that the device can generate coincides also with the number of chips in each code; also, to design this parameter, we have to trade the packet processing speed for code cardinality.

2.8 Experimental Setup

In order to characterize the E/D, for both the encoder and the decoder, an experimental setup as shown in FIG. 21 was used. To generate 16 different labels, a 10-GHz Gaussian laser pulse of 2.5-ps full-width at half-maximum (FWHM) width from a modelocked laser diode (MLLD) is fed into one of the device input ports, and the OCs at the output ports are examined with a streak camera.

2.9 Multi-Port E/D Applied in Multi-Code OCDM System

FIG. 22 shows how a multi-port E/D is applied to a multi-code OCDM system. The same E/Ds are used in the OLT 110 and the ONU 150 as shown respectively in FIGS. 25(1) and 25(2).

2.10 Multi-Port E/D in Block Cipher Cryptography

FIG. 23 shows how a multi-port E/D is applied in block cipher cryptography scheme.

The block cipher schemes correspond to M-ary transmission, in which data confidentiality relies on the correspondence of a message block of m bits and a ciphertext with M=$2^m$ determinations; the security keys are all the possible permutations of M=$2^m$ that are M!

In an M-ary transmission, a stream of m bits from a single user is encoded into M=$2_m$ codewords, to increase the transmission data rate and the spectral efficiency. The security relies on the logic to assign a different code to each bit sequence, and M-ary transmission are unconditionally secure because the adversary cannot discover this correspondence just making some guesses. We remark that in this case the codeword correspond to the ciphertext, and the security key is the correspondence between the bit stream and the codeword. A block cipher cryptographic system is perfectly secure, since the entropy of the key space Hk is larger than the message entropy Hm, according to the Shannon's theorem.

3. Optical Device with Phase Shifters

While the multi-port E/D as discussed above without phase shifters can generate codes with considerably high code cardinality, the security of the system can be enhanced if phase shifters are used. Hereinafter, application of the optical device of the present invention will be described.

3.1 OLT and ONU Architecture with Phase Shifters

Figure 24:
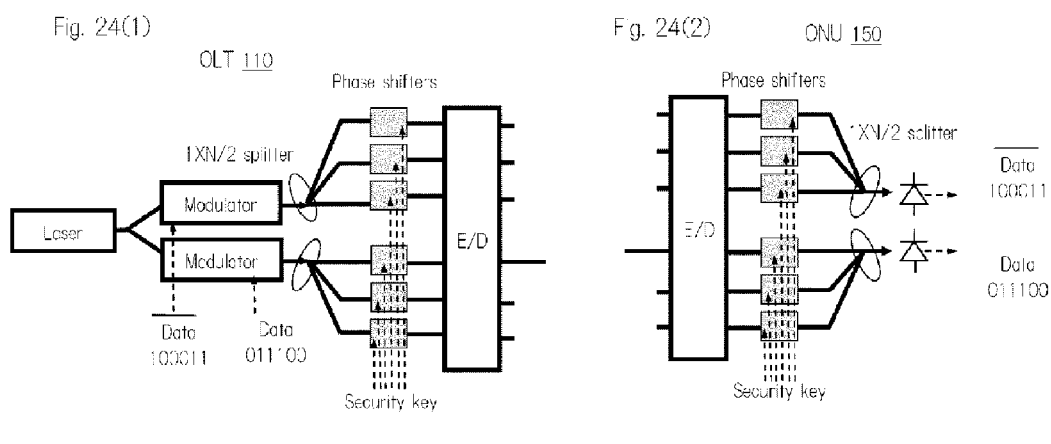
FIGS. 24(1) and 24(2) respectively show arrangements of an OLT and an ONU where an optical device according to the present invention is applied.

The OLT and ONU architectures are shown in FIGS. 24(1) and 24(2); respectively. The first N/2 ports of the encoder and decoder are used for the bit "1", and the remaining ones for the bit "0". In this case, the security key corresponds to the sequences of N phases that can have values 0 and pai.

3.2 Code Generation Scheme

The code generation scheme of the optical device will now be described.

An n-dimensional code is generated by summing n PSK codes (sending n laser pulses to the encoder input ports, simultaneously) and the corresponding spectrum is composed of n non-overlapping frequency subband (see FIG. 3(a)).

In order to compare the code generation scheme of the present invention with that of the conventional 2-dimensional code generation, the schematic of the code generation in the conventional 2-dimensional code generation is shown in FIGS. 25(1) and 25(2), while the schematic of the code generation in the present invention is shown in FIGS. 25(3) and 25(4):

Referring to FIG. 25(1), in the time-domain, the sum of two coherent PSK codes results in a code with chips of different amplitudes and phases. On the other hand, the frequency content of a 2-dimensional code is the superposition of two non-overlapping frequency subbands (see FIG. 25(2)).

Figure 28:
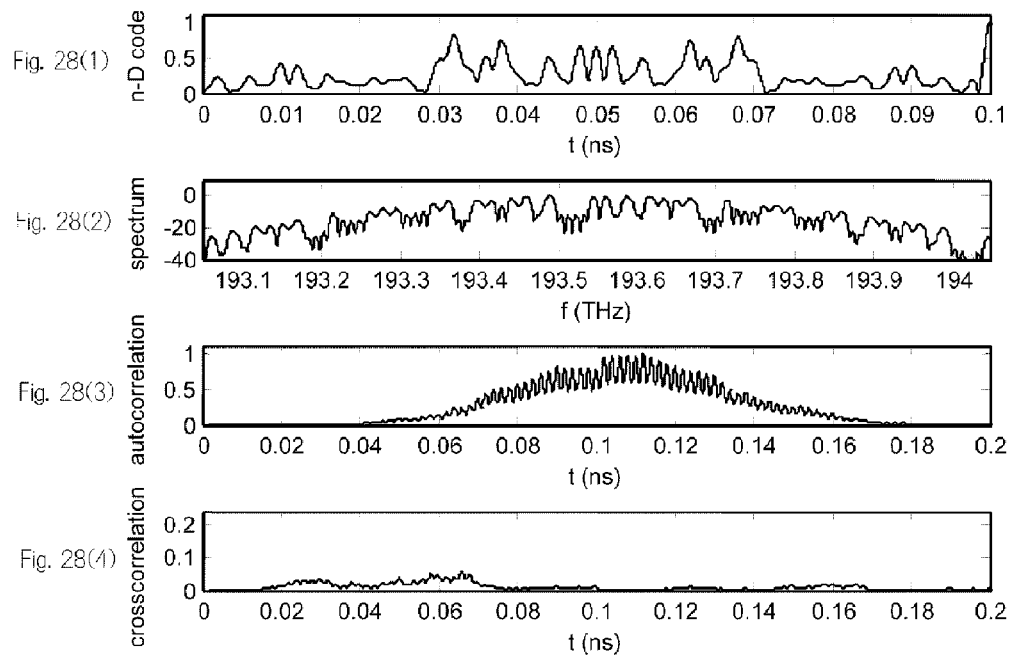
FIGS. 28(1)-28(4) show codes generated by an optical device for the case of N=50 ports fed with n=25 simultaneous coherent laser pulse in a random configuration.

When phase shifters are used a degree of freedom can be added by changing the phases of the coherent laser pulses that are used to generate a n-dimensional code, obtaining a spectral-phased code, according to the scheme of FIGS. 28(3) and 28(4).

This is observed as a hybrid configuration, that belongs to both direct-sequence and spread-spectrum techniques. A pseudo-random binary phase code is generated, with phase shifts of 0 or pai, that are applied to n=50 coherent laser pulses, sent to the encoder input ports.

Figure 26:
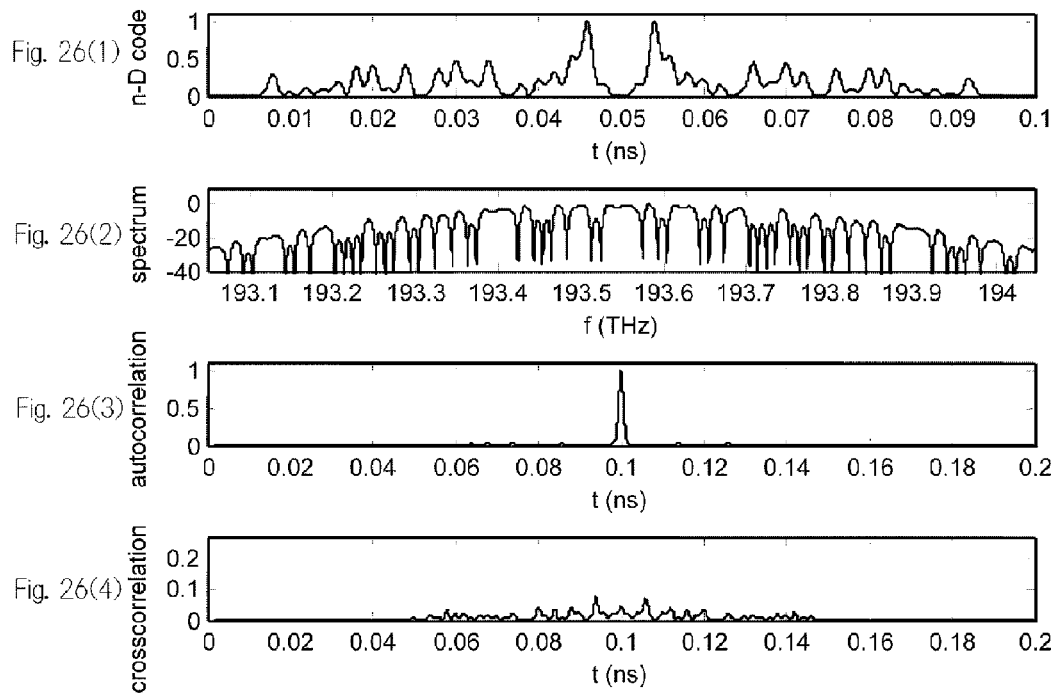
FIGS. 26(1)-26(4) show codes generated by an optical device according to the present invention, the corresponding spectrum, the auto and cross-correlation signals, respectively.

The intensity and the frequency spectrum of the spectral-phased multi-dimensional code are illustrated in FIGS. 26(1) and 26(2), respectively. The matched and unmatched decoded signals are illustrated in FIGS. 26(3) and 26(4). Since all the encoder (and decoder) ports are used, the matched signals coincide with the short input laser pulse; in asynchronous OCDM schemes, a delta-like shaped auto-correlation signal is advisable, to reduce both MAI and beat noises.

Figure 27:
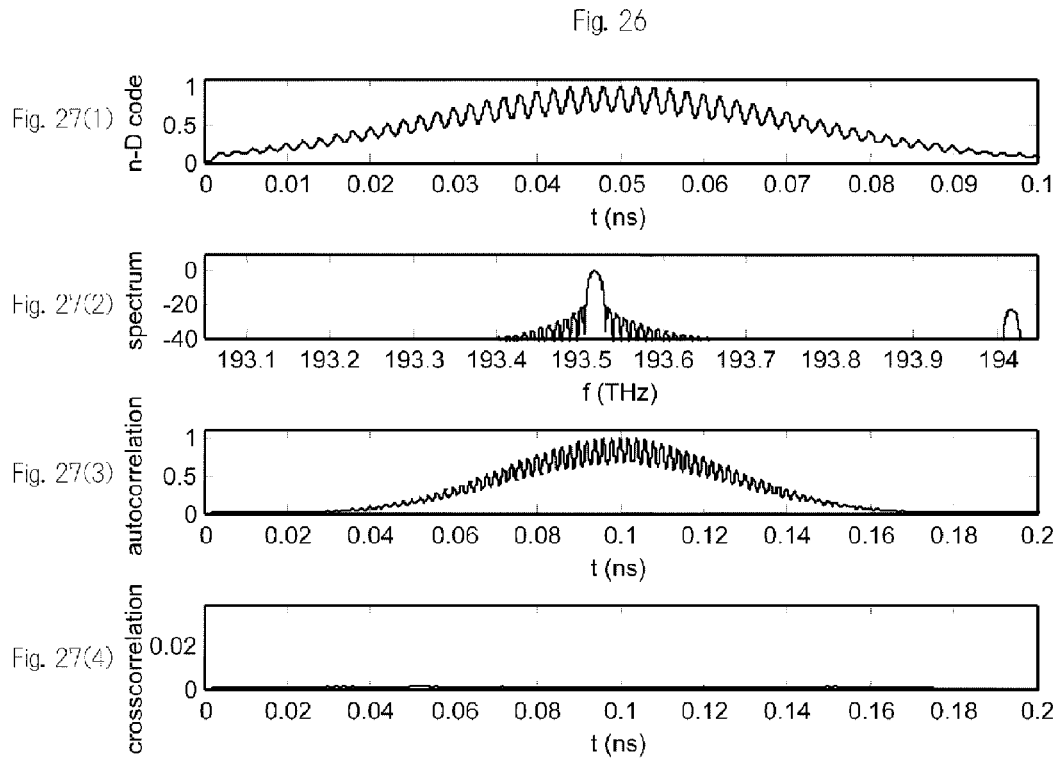
FIGS. 27(1)-27(4) show codes generated by an optical device for the case of 1-dimensional PSK code generation, the corresponding spectrum, the auto and cross-correlation signals, respectively.

For comparison, corresponding signals are illustrated in FIGS. 27(1)-(4) for the case of 1-dimensional PSK code generation using N=50 ports fed with n=1 laser pulse. Also, illustrated in FIGS. 28(1)-(4) are the corresponding signals for the case of N=50 ports fed with n=25 simultaneous coherent laser pulse in a random configuration.

By comparing the FIG. 26(3) with FIGS. 27(3) and 28(3), it is obvious that the use of the phase shifter resulted in sharp-peak autocorrelation signal. This explains that that the present invention improves the code performance.

3.3 Security Evaluation

As for the n-dimensional codes generated without using phase shifters, the number of all possible keys is

[Math. 83]

$$\binom{N}{n}$$

On the other hand, the number of all possible keys is $2^N$ for the spectral-phased codes.

Figure 29:
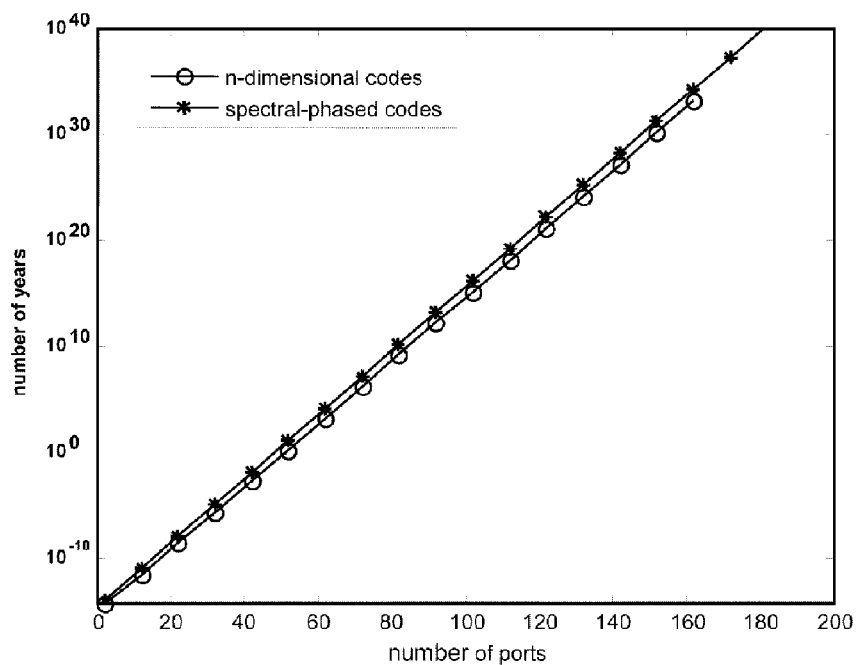
FIG. 29 shows a graph indicating security versus the number of ports for n-dimensional codes and spectral-phased codes.

Consider a brute-force code searching attack, the number of years required to break a code was evaluated, assuming that an adversary is able to test $10^7$ codes per second. The security versus the number of ports is plotted in FIG. 29 for n-dimensional codes and the spectral-phased codes.

While both code generation schemes are computationally secure for a large value of N, the security of the spectral-phased codes is found to be higher than that of the n-dimensional codes.

3.4 Numerical Simulation of Phase Values for the Phase Shifters

Two cases of numerical simulations were analyzed. In the case a), all the phase shifters have the same value, and therefore the code is delta-like. Of course, in this case, the auto and cross-correlation functions are the same. In the case b), a random distribution of 8 phase shifters have a value pai, and all the remaining phase shifters have values 0.

Figure 30:
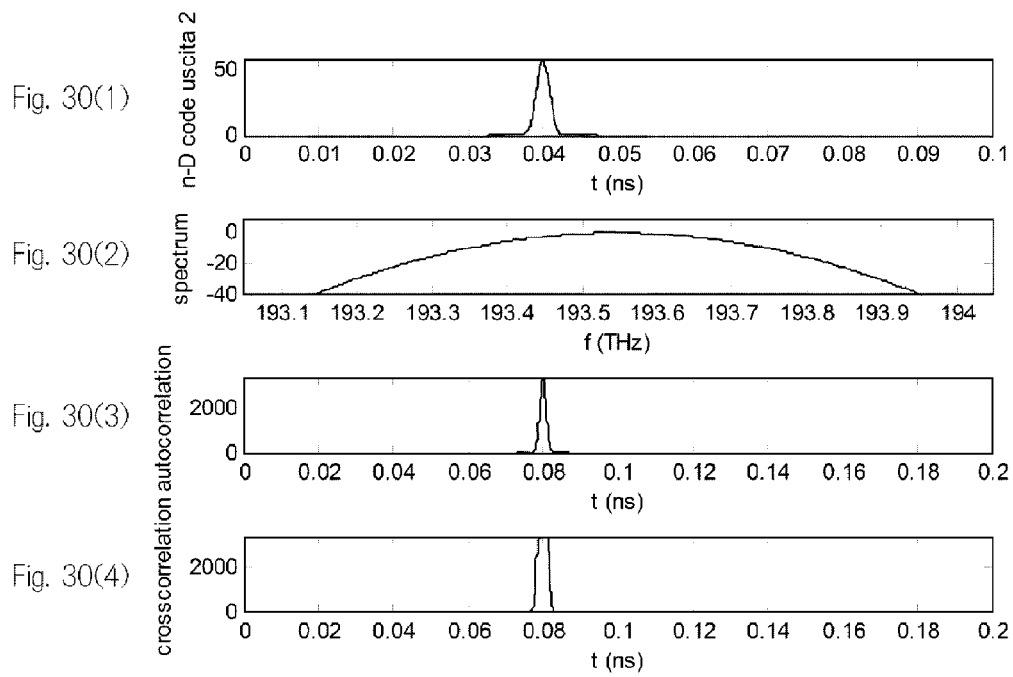
FIGS. 30(1)-30(4) show codes generated in case all the phase shifters of an optical device according to the present invention have the same value, the corresponding spectrum, the auto and cross-correlation signals, respectively.
Figure 31:
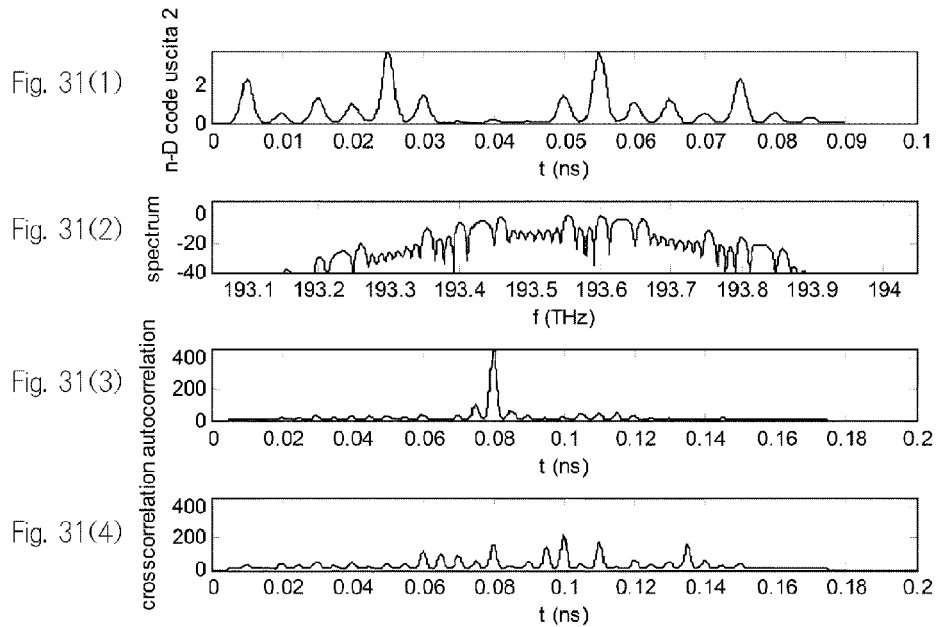
FIGS. 31(1)-31(4) show codes generated in case of a random distribution of 8 phase shifters have a value pai, and all the remaining phase shifters have values 0 according to the present invention, the corresponding spectrum, the auto and cross-correlation signals, respectively.

The codes generated, the corresponding spectrum, the auto and cross-correlation signals are shown in FIGS. 30(1)-34(4) and 31(1)-(4), respectively. The code is no more delta-like, but the cross-correlation becomes very small. It is important to observe that we have two parameters to select a code: given a phase shift distribution, we can select a different code by selecting a different output k. Otherwise, we can change the code set, by varying the phase shift values.

3.5 Application of the Present Invention in Optical Packet and Burst Switching The optical device of the present invention can be applied to both optical packet switching (OPS) and optical burst switching (OBS). The routing node configuration is almost the same as that of described above referring to FIG. 17.

To generate a new label, the values of the phase shifters have to be set and the encoder output port has to be selected. To process a code, the same values of the phase shifters have to be set, and only at the matched port the autocorrelation peak is measured.

Therefore, the system architecture is extremely flexible, because we can work with a set of codes, generated at the device ports, if the phase shifter values have been fixed properly in both the encoder and decoder. For instance the code shift values can be used to fix a class of service (CoS) or the quality of service (QoS), in a multi-cast OPS/OBS architecture.

Figure 32:
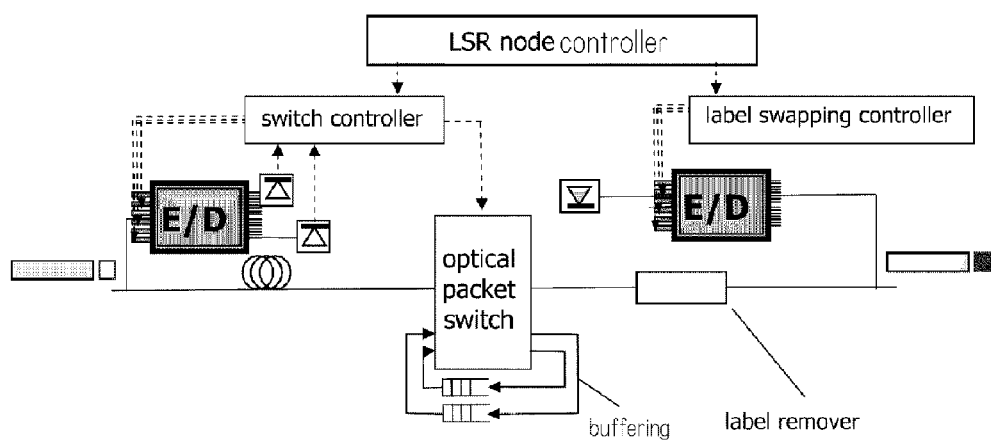
FIG. 32 shows an arrangement of an optical packet switch node in which the present invention can be applied.

This scheme is illustrated in FIG. 32. Since the autocorrelation peak coincides with the input pulse, it is also possible to think of a cascade of encoder/decoder, without O/E conversion.

Figure 33:
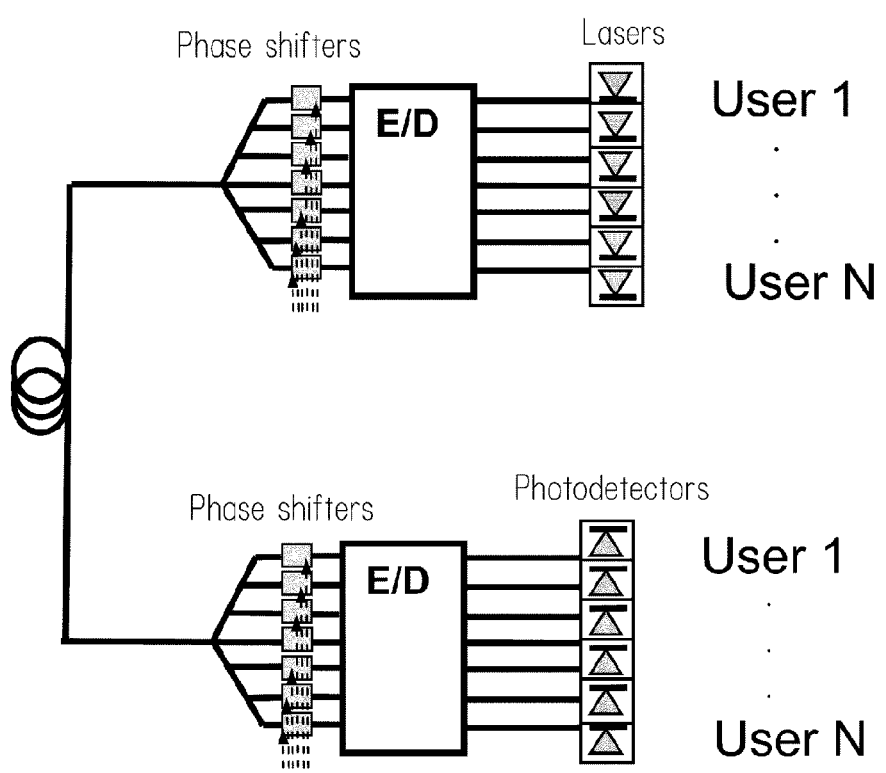
FIG. 33 shows an arrangement of an OCDMA scheme where an optical device according to the present invention can be applied.

3.6 Application of the Present Invention in Optical Packet and Burst Switching FIG. 33 shows an OCDMA scheme where the present invention is applied. When a user 1 transmits data, a short pulse generated by a laser light source enters the first port of the E/D, there are different codes generated at all the E/D output ports. Each code is phase shifted and all the codes are sum together.

On the receiving side, the phase sifters are placed at the input ports of the E/D, instead at the output ports. Since the device is passive and reciprocal, the phase shifters can be placed at either side of the E/D. This is completely equivalent.

Figure 34:
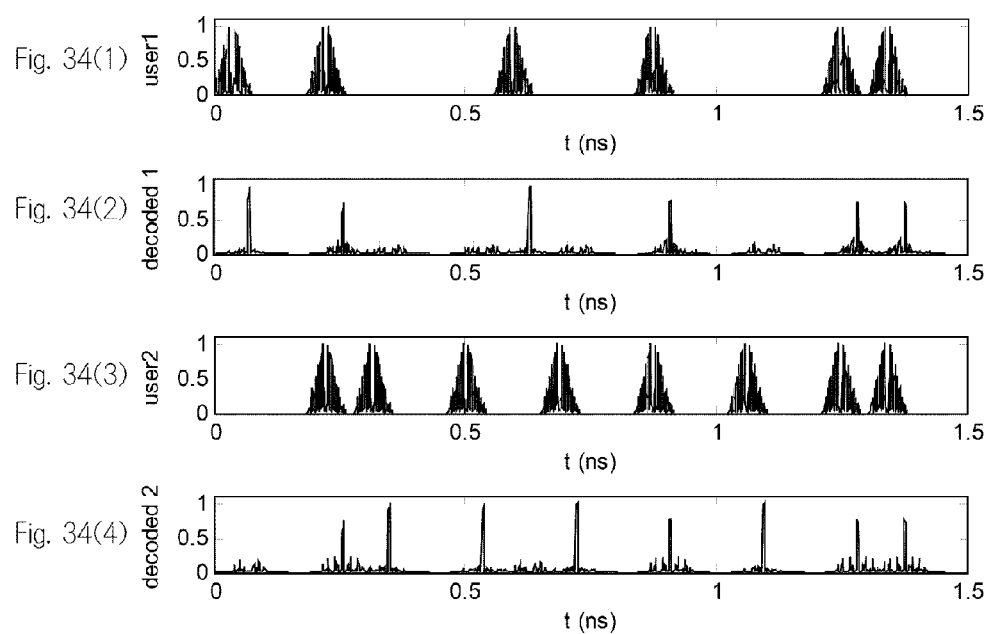
FIGS. 34(1)-34(4) show numerical results of a 15-user OCDMA transmission codes generated.

In this case, the routing node configuration is almost the same as described above. Each user transmits asynchronously, with its own bit rate. To properly demultiplex the OCDMA signal, the phase values of the phase shifters applied to the E/D on the receiving side must be set in the same way as those of the transmitting side. The numerical results of a 15-user OCDMA transmission is shown in FIG. 34.

3.3 Maximum Length Sequence

For packet switching, any combination of phase shift values can be chosen. The lowest autocorrelation corresponds to a phase distribution where N/2 phases are pai, and the rest are 0. But good performance can be obtained with random phases, with values that can vary in the range 0, 2 pai. This would increase largely the confidentiality, because the number of different combinations of phases is very large.

However, in the case of OCDMA; the spectral encoding technique always request that two codes do not overlap. Since the codes are generated simultaneously, an arbitrary combination of phase shift values may result in overlap of the codes. Therefore, in order to avoid overlap of the codes, an optimal phase distribution should be considered, that is valid for any spectral phase encoding technique.

By selecting phases according to a maximum length sequence (MLS), orthogonal codes can be obtained so that the results shown in FIG. 34 can be obtained.

INDUSTRIAL APPLICABILITY

The optical device of the present invention can be used in the fields of optical communication, specifically for a MPLS network and a CDMA network.

The invention claimed is:

1. An optical device comprising:
   an input port (Pi);
   a splitter (SP) splitting an input light from the input port (Pi) into a plurality of coherent copies of the input light simultaneously, the input light being a coherent light;
   a plurality of waveguides connected with the splitter (SP), each of the plurality of coherent copies of the input light passing on each of the waveguides;
   a plurality of phase shifters (PS), inserted along with each of the waveguides, wherein each of phase shifters (PS) is capable of shifting the light split by the splitter (SP);
   a multi-port encoder/decoder (RID), the multi-port encoder/decoder (E/D) being connected with all of the waveguides, all of the light from the phase shifters (PS) being input into the multi-port encoder/decoder (E/D), wherein the multi-port encoder/decoder (E/D) encodes all of the input light from the phase shifters simultaneously so that it generates spectral encoded codes simultaneously; and
   a plurality of output ports (Po), the output ports (Po) being connected with the multi-port encoder/decoder (E/D), the output ports (Po) outputting the spectral encoded codes generated by the multi-port encoder/decoder (E/D);
   wherein the multi-port encoder/decoder (E/D) comprising:
   a first coupler, the first coupler being a single-piece slab coupler, the first coupler having a plurality of input waveguides, each of the input waveguides being connected with one of the phase shifters (PS);
   a second coupler, the second coupler being a slab coupler, the second coupler having a plurality of output waveguides, each of the output waveguides being connected with the output ports (Po); and
   a plurality of connecting waveguides, the connecting waveguides connecting the first coupler and the second coupler, each of the connecting waveguides differs its length.

2. The optical device according to claim 1, wherein the input port (Pi), the splitter (SP), the waveguides, the phase shifters (PS), the multi-port encoder/decoder (E/D), and the output ports (Po) are fabricated on a same substrate.

3. The optical device according to claim 1, wherein the optical device generates simultaneously N spectral encoded optical codes, wherein the multi-port encoder/decoder (E/D) meets the following equation, $$N = (\lambda R)/(n_s \, d \, d_o)$$

wherein lambda is wavelength of light input into the multi-port encoder/decoder (E/D), R is the slab focal length of the first coupler and the second coupler, $n_s$ is the effective refractive index of the first coupler and the second coupler, d is the pitches of the connecting waveguides, and $d_o$ is the pitches of the input waveguides and output waveguides.

4. An optical packet switching device comprising the optical device according to claim 1.

5. An optical burst switching device comprising the optical device according to claim 1.

6. An optical communications device for OCDMA comprising the optical device according to claim 1.

7. An optical communications device for MPLS comprising the optical device according to claim 1.

* * * * *